United States Patent
Bickham et al.

(10) Patent No.: US 7,991,287 B2
(45) Date of Patent: Aug. 2, 2011

(54) OPTICAL COMMUNICATION SYSTEM WITH SUPPRESSED SBS

(75) Inventors: Scott R. Bickham, Corning, NY (US); Aleksandra Boskovic, Elmira, NY (US); Andrey Kobyakov, Painted Post, NY (US); A. Boh Ruffin, Painted Post, NY (US); Richard E. Wagner, Elmira, NY (US)

(73) Assignee: Corning Incorporated, Corning, NY (US)

( * ) Notice: Subject to any disclaimer, the term of this patent is extended or adjusted under 35 U.S.C. 154(b) by 2235 days.

(21) Appl. No.: 10/837,868

(22) Filed: May 3, 2004

(65) Prior Publication Data

US 2004/0247320 A1  Dec. 9, 2004

Related U.S. Application Data

(60) Provisional application No. 60/477,446, filed on Jun. 9, 2003, provisional application No. 60/478,291, filed on Jun. 11, 2003, provisional application No. 60/546,493, filed on Feb. 20, 2004.

(51) Int. Cl.
*H04B 10/00* (2006.01)
*H04J 14/00* (2006.01)
*H04J 14/02* (2006.01)

(52) U.S. Cl. ............... 398/66; 398/94; 398/158

(58) Field of Classification Search ............ 398/66, 398/141–144, 147, 148, 158
See application file for complete search history.

(56) References Cited

U.S. PATENT DOCUMENTS

| | | | | |
|---|---|---|---|---|
| 5,210,631 | A * | 5/1993 | Huber et al. | 398/186 |
| 5,301,054 | A * | 4/1994 | Huber et al. | 398/66 |
| 5,598,289 | A | 1/1997 | Watanabe | 359/173 |
| 5,680,491 | A | 10/1997 | Shigematsu et al. | 385/24 |
| 5,812,294 | A * | 9/1998 | Wilson | 398/194 |
| 6,151,145 | A * | 11/2000 | Srivastava et al. | 398/1 |
| 6,323,993 | B1 * | 11/2001 | Hansen et al. | 359/337 |
| 6,516,113 | B1 | 2/2003 | Glingener et al. | 385/24 |
| 6,529,672 | B1 | 3/2003 | Blondel et al. | 385/140 |
| 6,535,315 | B1 | 3/2003 | Way et al. | 359/180 |

OTHER PUBLICATIONS

Lu et al., "*A Bidirectional Hybrid DWDM System for CATV and OC-48 Trunking*", IEEE Photonics Technology Letters, vol. 13, No. 8, Aug. 2001, pp. 902-904.

Yoshinaga, H., "*Influence of simulated Brillouin scattering on non-linear distortion in SCM video transmission*", Electronics Letters, Sep. 16, 1993, vol. 29, No. 19, pp. 1707-1708.

Bugos, A.R., "*60 Channel AM-VSB Video Transmission over 30 Kilometers of Optical Fiber Using a Nd:YA Laser and External Intensity Modulation*", Proceedings of the Southeast Conference, New York, IEEE, US, vol. 1, Apr. 7, 1991, pp. 289-292.

Aoki et al., "*Input Power Limits of Single-Mode Optical Fibers due to Stimulated Brillouin Scattering in Optical Communication Systems*", Journal of Lightwave Technology, vol. 6, No. 5, May 1988, pp. 710-719.

(Continued)

*Primary Examiner* — Dalzid Singh
(74) *Attorney, Agent, or Firm* — Joseph M. Homa; Matthew J. Mason

(57) ABSTRACT

An optical communication system and a communication network are disclosed herein capable of transmitting optical signals with high optical launch power over long distances with suppression of stimulated Brillouin scattering. A method of transmitting optical signals is also disclosed herein which comprises transmitting optical signals at high optical launch power with a high carrier-to-noise ratio (CNR). Passive optical networks disclosed herein provide greater reach and/or increased splits.

48 Claims, 8 Drawing Sheets

OTHER PUBLICATIONS

Skrimshire et al., "*Integrity of optical splitters in passive optical networks*", Optical/Hybrid Access Networks, 5th Conference, Sep. 7, 1993-Sep. 9, 1993, pp. 4.19.01-4.19.06.

Reichmann et al., "*Simultaneous Delivery of Four Independent Broadcast Television Services over a Wavelength-Division Multiplexed Passive Optical Network*", ECOC 97, Sep. 22-25, 1997, Conference Publication No. 448, pp. 69-72.

Kuhlow et al., "*AWG-Based Device for a WDM Overlay PON in the 1.5-µm Band*", IEEE Photonics Technology Letters, vol. 11, No. 2, Feb. 1999, pp. 218-220.

Frigo et al., "*Approaches to multiple service delivery over passive optical networks*", OFC '98 Technical Digest, Feb. 22-27, 1998, pp. 404-405.

Nakao et al., "*Splitter Positions and Testing Wavelength for Optical Fiber Access Networks*", Sep. 15-19, 1996, pp. 269-272.

Phillips et al., "*Redundancy Strategies for a High Splitting Optically Amplified Passive Optical Network*", Journal of Lightwave Technology, vol. 19, No. 2, Feb. 2001, pp. 137-149.

\* cited by examiner

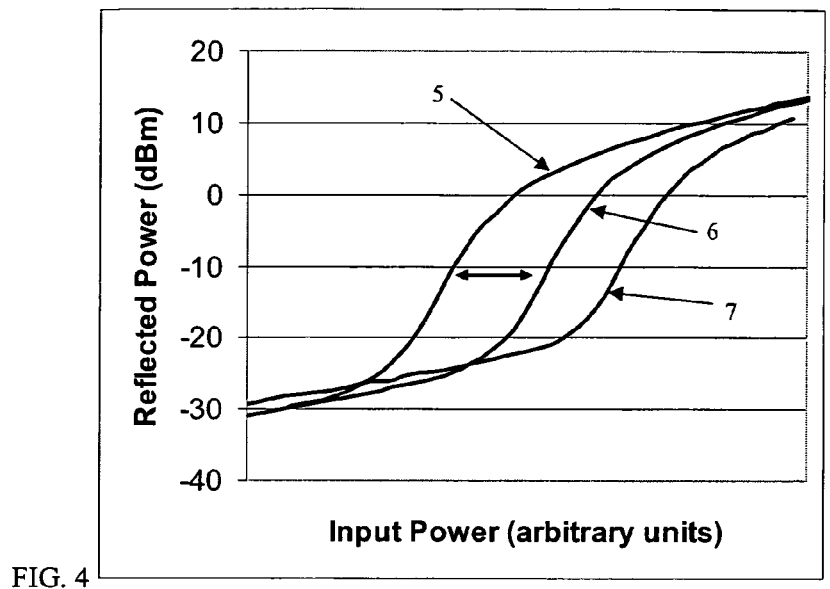
FIG. 4
FIG. 5
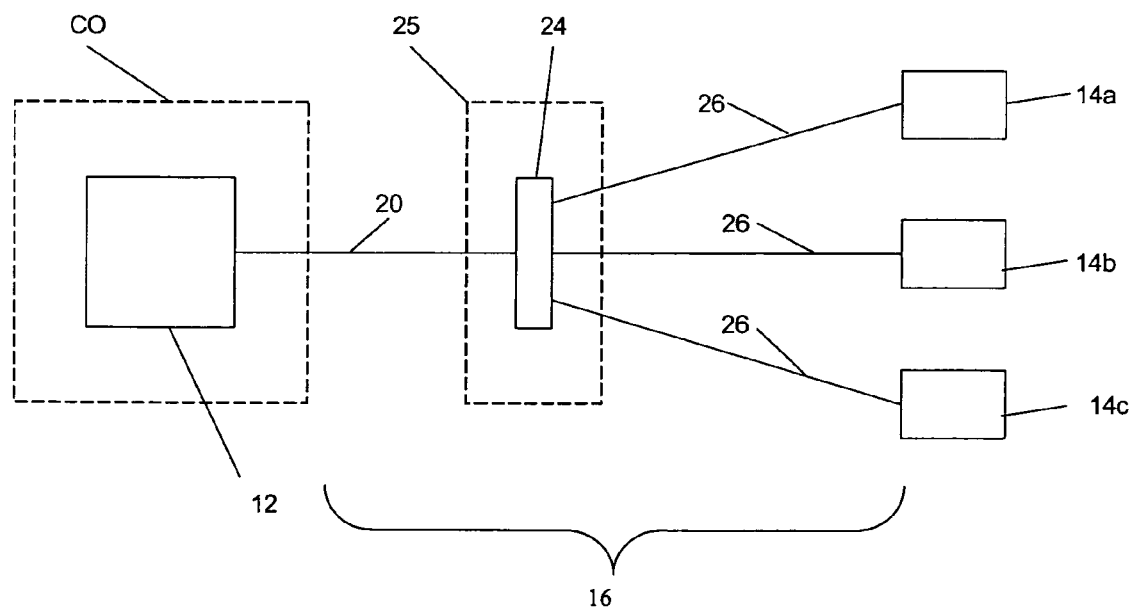

OPTICAL COMMUNICATION SYSTEM WITH SUPPRESSED SBS

CROSS-REFERENCE TO RELATED APPLICATIONS

This application claims the benefit of priority under 35 U.S.C. §119(e) of U.S. Provisional Application Ser. No. 60/477,446 filed on Jun. 9, 2003; U.S. Provisional Application Ser. No. 60/478,291 filed on Jun. 11, 2003; and U.S. Provisional Application Ser. No. 60/546,493 filed on Feb. 20, 2004.

BACKGROUND OF THE INVENTION

1. Field of the Invention

This invention relates to optical transmission systems and more specifically to a fiber optic transmission system capable of carrying a broadband signal over single mode optical fiber with high optical launch power.

2. Technical Background

Economical distribution of broadband signal content (such as multi-channel cable TV) over a single mode optical fiber system requires use of high optical signal powers. High optical signal powers enable the splitting of the optical signal for distribution over multiple fiber paths or alternatively transmission of signals over a single fiber path with a large link loss, as is typical of long distance transmissions. The availability of efficient erbium doped fiber amplifiers (EDFAs) operating in the 1550 nm wavelength region, where standard telecommunication fiber exhibits its minimum attenuation, has motivated the development of broadband transmitters compatible with the gain bandwidth of EDFAs. However, standard telecommunication single mode fiber (e.g. Corning SMF-28® fiber) exhibits dispersion in the 1550 nm region, which precludes the use of directly modulated distributed feedback lasers (DFBs) as a transmitter for cable television or high bit-rate digital signals. Instead, a typical transmitter operating at 1550 nm includes a narrow line width, externally modulated continuous wave (cw) DFB laser. The DFB laser light beam carries no information-bearing signals until the external modulation acts on the laser light beam to impress the information-bearing signals thereon. Here, "light" is not restricted to the visible spectrum. The optical power is amplified by an EDFA which is downstream from the external modulator. Thus the information bearing light signal enters the fiber optic span with an optical signal power determined by the saturated output power of the EDFA. Commercially available EDFAs offer saturated output powers exceeding 20 dBm.

As is well known, stimulated Brillouin scattering (SBS) is a nonlinear optical effect that poses a significant restriction to the amount of narrow-linewidth optical power that can be launched into a long length of single mode optical fiber. For a given length of single-mode fiber with a given attenuation coefficient at the chosen optical wavelength, there is an optical-linewidth-dependent threshold power below which appreciable SBS does not occur. For standard commercially available telecommunication fiber operating at 1550 nm, the SBS threshold for an optical source (laser) with an optical linewidth less than 10 MHz is less than 7 dBm for a fiber optic link of approximately 50 kilometer length.

Previously, in order to launch high optical signal powers in the 1550 nm wavelength region for transmission of broadband signals such as cable television over long fiber distances, one must suppress SBS. SBS degrades Carrier to Noise Ratio (CNR), Composite Second Order (CSO) and Composite Triple Beat (CTB) and induces power-dependent nonlinear attenuation in an optical fiber link, thereby also reducing the received optical power.

SUMMARY OF THE INVENTION

An optical communication system is disclosed herein capable of transmitting optical signals with high optical launch power, and/or with a large number of splits, over long distances. The system is particularly advantageous for fiber-to-the-premises (FTTP), including, but not limited to, fiber-to-the-home (FTTH) applications, although the system is not limited thereto. FTTP also includes fiber to apartment buildings, office buildings, and so forth. The system preferably utilizes a single-mode fiber having a high SBS threshold. Preferably the system includes a passive optical network (PON) for optically connecting an optical signal source, located in a head end or central office or central terminal, to one or more remote terminals located in remote user sites. The system preferably comprises a point-to-multipoint optical network for transmitting optical signals, and more preferably for transmitting and receiving optical signals. The system enables higher optical launch powers and/or longer optical path distances from the optical signal source to a primary splitter, wherein the primary splitter is the first split that the optical signal encounters after leaving the optical signal source. The system also enables an increased number of split paths at the primary splitter, and/or an increased number of aggregate splits in the optical path from the optical signal source to the intended remote terminal, wherein the remote terminal comprises a receiver for receiving the optical signal.

A communication network is also disclosed herein which is capable of transmitting optical signals at high optical launch power, and/or with a large number of splits, over long distances.

A method of transmitting optical signals is also disclosed herein which comprises transmitting optical signals at high optical launch power, and/or with a large number of splits, with a high carrier-to-noise ratio (CNR).

Operation under a sub-carrier multiplexed ("SCM") signal format is particularly suitable for all of the embodiments disclosed herein. Preferably, signals under the SCM signal format have an analog component.

As used herein, the output power of an optical signal source is greater than or equal to the input power into the associated optical distribution network.

Reference will now be made in detail to the present preferred embodiments of the invention, examples of which are illustrated in the accompanying drawings. An exemplary embodiment of a segmented core refractive index profile in accordance with the present invention is shown in each of the figures.

BRIEF DESCRIPTION OF THE DRAWINGS

FIG. 4 shows the measured reflected power as a function of input power for three optical fibers with lengths of about 50 km.

FIG. 5 schematically illustrates another preferred embodiment of an optical communications system comprising a CO and a passive optical network.

DETAILED DESCRIPTION OF THE PREFERRED EMBODIMENT

Figure 1:
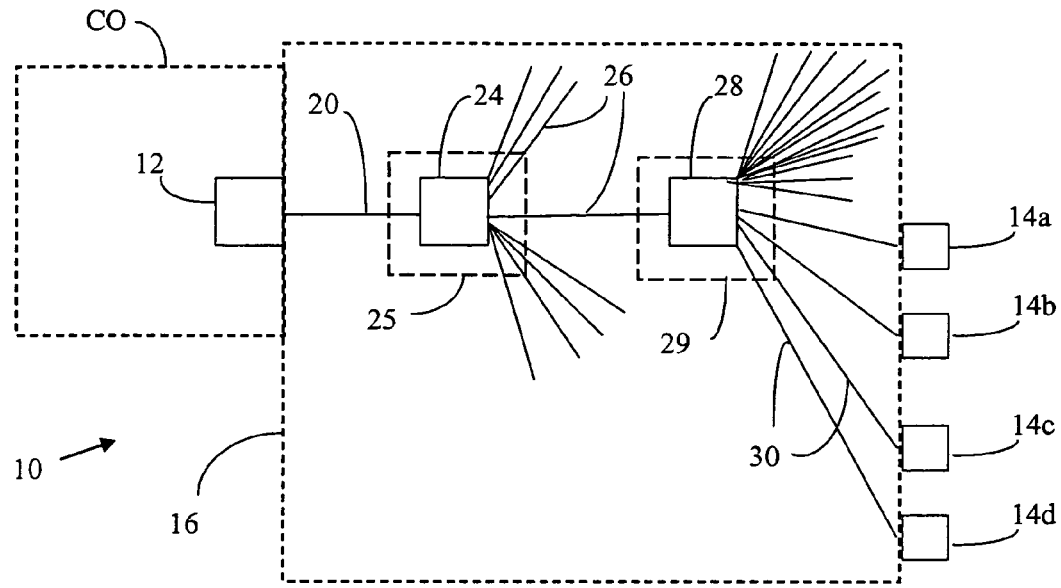
FIG. 1 schematic illustrates a communications network employing an optical distribution network.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. In cases where the refractive index of an annular region or a segment is less than the average refractive index of the cladding region, the relative index percent is negative and is referred to as having a depressed region or depressed index, and is calculated at the point at which the relative index is most negative unless otherwise specified.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. A zero-dispersion wavelength corresponds to a wavelength where the dispersion has a value of 0.

"Effective area" is defined as:

$$A_{eff} = 2\pi (\int E^2 \, r \, dr)^2 / (\int E^4 \, r \, dr),$$

where the integration limits are 0 to $\infty$, and E is the electric field associated with light propagated in the waveguide.

The mode field diameter (MFD) is measured using the Peterman II method wherein, $2w = MFD$, and $w^2 = (2\int E^2 \, r \, dr / \int [dE/dr]^2 \, r \, dr)$, the integral limits being 0 to $\infty$.

The bend resistance of a waveguide fiber can be gauged by induced attenuation under prescribed test conditions.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

An optical waveguide fiber link, or line, as used herein, comprises an optical fiber or a plurality of optical fibers, or an optical fiber cable, or a plurality of optical fiber cables. An optical fiber cable comprises one or more optical fibers. An optical signal transmitted through an optical fiber travels through an associated optical fiber path length. The length of waveguide fiber can be made up of a plurality of shorter lengths that are spliced or connected together in end to end series arrangement. A link or line can include additional optical components such as optical amplifiers, optical attenuators, optical isolators, optical switches, optical filters, or multiplexing or demultiplexing devices. In preferred embodiments disclosed herein, an optical fiber link or optical fiber line consists of optical fiber or optical fiber cable which does not employ active components (even if active components are connected to the optical fiber line), and in those preferred embodiments the optical fiber link or optical fiber line consists of optical fiber or optical fiber cable with no active components. Unless otherwise noted herein, the term "active components" includes active electronics and equipment or devices that accompany active components or electronics.

"Optically connecting" as used herein means either directly connecting (without other elements interposed) or indirectly connecting (with other elements interposed). The elements may be passive or active, and can include optical fiber, components, connectors, or other devices, apparatuses, or equipment. For example, an optical fiber line optically connects a transmitter and a receiver, wherein the transmitter may be connected to an amplifier by a first optical fiber (such as a pigtail), the amplifier may be connected to a variable optical attenuator (VOA) by a second optical fiber, the VOA may be connected to a third optical fiber within the optical fiber line, the other end of the third optical fiber may be connected to a fourth optical fiber (such as a pigtail), and the fourth optical fiber may be connected to the receiver, such that optical signals may be transported in at least one direction between the optically connected transmitter and receiver.

Carrier to Noise Ratio (CNR) is the ratio, given herein in decibels (dBc), of the carrier power to the average noise power, measured within a 4 MHz bandwidth for channels in the 45-560 MHz range.

Composite Second Order (CSO) is the ratio of the aggregate distortion signal peak power found at ±0.75 MHz and ±1.25 MHz from the carrier frequency to the channel carrier power. This distortion is caused by second order nonlinear phenomena in the transmission system. It is often given as distortion power composite relative to the carrier, in decibels below the measured channel's carrier (−dBc), and this convention is used herein.

Composite Triple Beat (CTB) is the ratio (in decibels) of the peak of the aggregate distortion signal found at the carrier frequency to the carrier power. This distortion is produced by third order nonlinearities in the transmission system and is reported herein in −dBc.

Unless stated otherwise herein, CNR, CSO, and CTB are measured for channels in the 45-560 MHz range, and, unless stated otherwise herein, CNR, CSO, and CTB are measured at the remote terminal, and in particular at the entrance to the remote terminal.

FIG. 1 schematically illustrates a communications network 10 which can be used in a telecommunications system employing an optical distribution network 16. In one preferred embodiment, the optical distribution network 16 is a passive optical network (PON). A PON can be used to deliver broadband network access services to a plurality of end users or customers. For example, the passive network connection from a central office (or head end or central terminal or central switch) to the remote terminal (for connection to the end user) has no active components or active electronics (such as active repeaters). The passive network connection preferably does not employ active components (or active electronics), even if such active components are optically connected within the optical fiber line. Preferably, the optical fiber link or optical fiber line consists of optical fiber or optical fiber cable. The communications network 10 illustrated in FIG. 1 has a central terminal, or a head end, or optical line terminal (OLT) 12 located in a central office (CO) and a plurality of remote terminals, so-called optical network terminals (ONTs) 14a to 14d. An optical signal source is located within the central office, such as, for example, a laser transmitter located in a central terminal 12. The central terminal in the CO may further comprise an optical attenuator, such as a variable optical attenuator (VOA), optically connected to the amplifier. The central terminal may further comprise an amplifier for amplifying the optical signal. The central terminal may comprise a plurality of transmitters and/or a plurality of amplifiers. The optical signal source may derive its broadcast signals or services from either inside the CO or outside the CO, for example via satellite, high speed link, pre-recording, on-site generation, or internet service provider (ISP), wherein the optical signal source outputs a modulated optical signal, such as a modulated broadband optical carrier signal. The optical signal source may obtain its broadcast signals or services by electrical connections, optical connections, and/or wireless communication. A plurality of sources can provide signals instead of a single source. The system may further comprise a plurality of optical distribution networks. In the embodiment illustrated in FIG. 1, optical distribution network 16 comprises a trunk optical fiber line, which is also referred to herein as a feeder line, 20 which contains a first length of trunk optical fiber, also referred to herein as feeder fiber, which optically connects OLT 12 to a primary splitter 24 (for example a 1×8 power splitter), which is preferably disposed within a remote node 25 which is advantageously an enclosure or housing. The network 16 also comprises branch optical fiber link or distribution line 26 containing a second length of optical fiber, also referred to herein as distribution fiber, which connects the primary splitter 24 to an intermediate splitter 28 which is preferably disposed within an intermediate node 29 which is advantageously an enclosure or housing. In preferred embodiments, no active components are employed in the remote node 25. In preferred embodiments, no active components are employed in the intermediate node 29. The intermediate splitter 28 (for example a 1×16 splitter) is preferably contained within the intermediate node 29 with no active components employed in the intermediate node 29. Intermediate splitter 28 is optically connected to ONTs 14a-14d via another branch optical fiber link or distribution line 30, which may be referred to as "drop line". Preferably, optical fiber links, or lines, 20, 26, and 30 and the splitters 24 and 28 and the accompanying hardware (such as nodes, clamps, connectors, and the like) make up the optical distribution network 16. The ONTs 14a-14d are connected to the OLT 12 by the optical network 16. The OLT 12 is located in the central office CO which serves as the so-called "head end" of the optical distribution network 16 and which serves to connect the optical distribution network 16 to a core network as part of an optical communication system. Customers or subscribers may be connected (optically and/or electrically and/or wirelessly, preferably optically) to the ONTs 14a-d. Primary splitter 24 is located a spatial distance away from, i.e. is spaced away from, the central office CO while feeder line 20 optically connects the CO, to primary splitter 24 with a fiber length equal to, or greater than, spatial distance D. Preferably the spatial distance D between the CO and remote node 24 is greater than 500 m, more preferably greater than 1 km, even more preferably greater than 2 km.

In one embodiment, optical signals propagate in only one direction, i.e. in a downstream direction, e.g. from the OLT 12 to the ONTs 14a-14d. In another embodiment, optical signals propagate in two directions (bi-directional), i.e. both in a downstream direction, e.g. from the OLT 12 to the ONTs 14a-14d, and in an upstream direction, e.g. from at least of the ONTs 14a-14d to the OLT 12, that is, the communication network is capable of bi-directional transmission (upstream and downstream) between the central terminal (or head end) 12 and the remote terminals 14a-14d. In one bi-directional transmission embodiment, both the upstream and downstream transmissions between an OLT 12 and a respective ONT 14 occur over the same optical fiber in at least one of the optical fiber links 20, 26, or 30 optically connecting the OLT 12 and the respective ONT 14. In a preferred embodiment, both the upstream and downstream transmissions between an OLT 12 and a respective ONT 14 occur over the same optical fibers in all of the optical fiber links, or lines, optically connecting the OLT 12 and the respective ONT 14. A return path from the ONTs to the OLT can be provided, for example, by wavelength-division multiplexing the downstream and upstream traffic over the optical distribution network 16. In this embodiment, the splitter is capable of splitting (downstream optical signals) and merging (upstream optical signals).

In an alternate bi-directional transmission embodiment, the optical distribution network 16 is effectively two parallel passive optical networks (two sets of optical fiber links for optically connecting the OLT 12 to the ONTs 14a-14d, one for the downstream traffic and the other for the upstream traffic, wherein the upstream and downstream transmissions between an OLT 12 and a respective ONT 14 occur over different optical fibers in at least one of the optical fiber links optically connecting the OLT 12 and the respective ONT 14. In one embodiment, the upstream and downstream transmissions between an OLT 12 and a respective ONT 14 occur over different optical fibers in all of the optical fiber links optically connecting the OLT 12 and the respective ONT 14. For example, referring to FIG. 1, lines 20, 26 and 30 each represent at least two parallel optical fibers within each line, wherein one of the optical fibers is utilized for upstream transmission and another of the optical fibers is used for downstream transmission.

Thus, the optical distribution network 16 disclosed herein comprises a primary splitter 24, preferably disposed in remote node 25 and a plurality of optical fiber lines 20, 26, 30 for optically connecting the optical signal source, or central terminal, to the plurality of remote terminals. Preferably, the optical distribution network 16 comprises a plurality of splitters including a primary splitter 24 at remote node 25 and at least one intermediate splitter 28 disposed in at least one intermediate node 29. Preferably, one or more of the splitters (24, 28) both split and merge optical signals for handling both upstream and downstream signals.

In a preferred embodiment, the trunk optical fiber link or feeder line 20 and the remote node 24 (containing primary splitter) do not employ active components and preferably include no active components. In another preferred embodiment, the entire optical distribution network 16 does not employ active components and preferably has no active components. The communications network, or a portion of the communications network, thus preferably includes a passive optical network which does not require the expense, installation, and maintenance of active components and/or equipment. In other embodiments, the communications network, or a portion of the communications network, may include an active optical network comprising active components and/or equipment.

According to various embodiments disclosed herein and referring to FIG. 1 for illustration, optical signals can thus be transmitted from the optical signal source at the CO (such as from center terminal or OLT 12), through a trunk optical fiber link or feeder line 20, and into a primary splitter 24 included within remote node 25. The primary splitter 24 then splits the optical signal. A remote terminal 14a-14d, and a corresponding receiver if available at the remote terminal, can be optically connected to the primary splitter 24 via a branch optical fiber link or distribution line (26 and/or 30). In preferred embodiments, the optical distribution network 16 further comprises one or more intermediate splitters 28 included within one or more intermediate nodes 29. A remote terminal 14a-14d, and a corresponding receiver if available at the remote terminal, can be optically connected to the intermediate splitter 28 via a branch optical fiber link or distribution line 30.

Figure 2A:
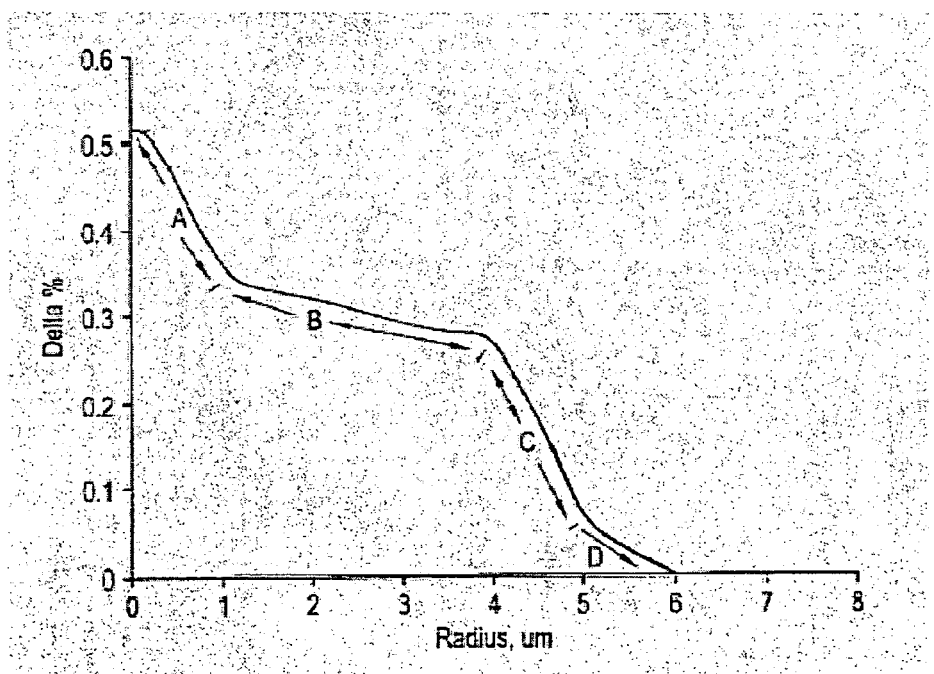
FIG. 2A is a schematic representation of the relative refractive index of an optical fiber suitable for use as disclosed herein.
Figure 2B:
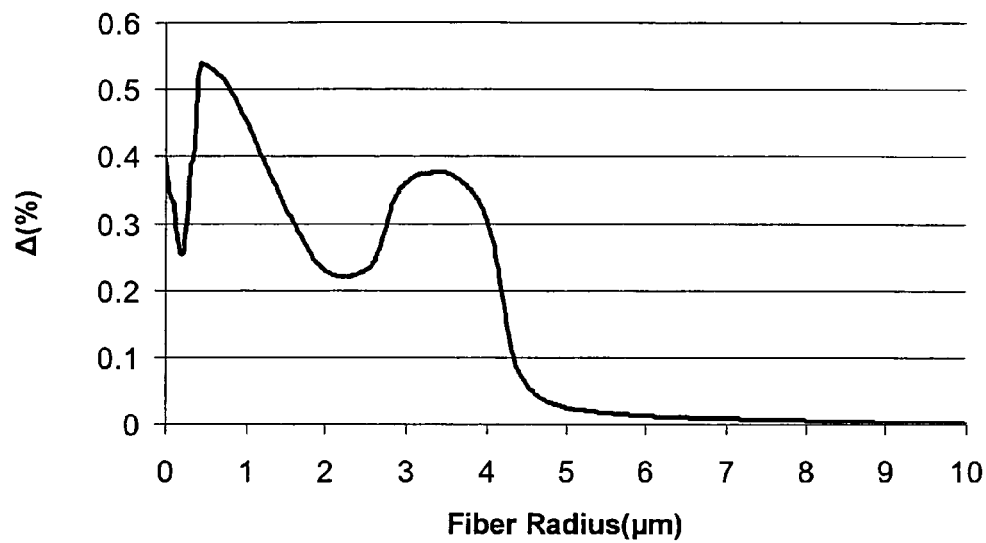
FIG. 2B is a schematic representation of the relative refractive index of another optical fiber suitable for use as disclosed herein.

Stimulated Brillouin scattering in the optical distribution network 16 can be advantageously suppressed by utilizing optical fiber such as that disclosed in U.S. Pat. No. 6,490,396 and U.S. Provisional Patent Application Ser. Nos. 60/467,676, 60/507,313, and 60/528,953, all of which are incorporated herein by reference. In particular, implementation of such fiber in the trunk optical fiber link or feeder line 20 enhances SBS suppression. In preferred embodiments, all of the optical fiber in the optical distribution network 16, that is, in the trunk optical fiber link or feeder line 20 and the branch optical fiber links or distribution lines 26 and/or 30, are of the same optical fiber type. A schematic representation of the relative refractive index of one such preferred optical fiber that can be used is shown in FIG. 2A, which corresponds to FIG. 6 (A-B-C-D) of U.S. Pat. No. 6,490,356. The relative refractive index of another such preferred optical fiber that can be used is shown in FIG. 2B. Utilization of such optical fiber allows higher optical launch power into the optical distribution network 16 and/or allows a greater optical path length of the trunk optical fiber link 20 than was previously thought possible without incurring SBS signal impairments. The optical fiber path length may differ from the actual physical distance by which the central office CO containing central terminal and the primary splitter 24 are separated, for example if the optical fiber or optical cable of feeder line 20 is at least partially coiled or folded or otherwise not fully extended in a straight line from the source to end point, e.g. from the end into which the optical signal is launched to the opposite end where the signal is delivered. Such fibers guide at least one optical mode and a plurality of acoustical modes, including an $L_{01}$ acoustical mode and an $L_{02}$ acoustical mode. Preferably, the fibers are single-moded, and have low optical losses, in a selected operating wavelength range. The optical fiber comprises a core having a refractive index profile and a centerline and a cladding layer surrounding and directly adjacent the core. In some preferred embodiments, the core segment comprises a single core segment having a refractive index profile which decreases substantially continuously with radius. In other preferred embodiments the core has two or more portions or segments. The effective area of the optical mode of such fibers at 1550 nm is greater than 70 μm², more preferably greater than 80 μm², and in some preferred embodiments greater than 90 μm². The $L_{01}$ acoustical mode has a first acousto-optic effective area, $AOEA_{L01}$, not less than 140 μm², more preferably not less than 150 μm², and most preferably not less than 160 μm² at the Brillouin frequency of the optical fiber; the $L_{02}$ acoustical mode has a second acousto-optic effective area, $AOEA_{L02}$, not less than 140 μm², more preferably not less than 150 μm², and even more preferably not less than 160 μm² at the Brillouin frequency of the optical fiber. Preferably, the relation of the L01 and L02 acoustic effective areas of the fibers are such that $0.4 < AOEA_{L01}/AOEA_{L02} < 2.5$.

In some preferred embodiments, the relative refractive index of the core preferably lies between an upper boundary curve and a lower boundary curve. The upper boundary curve is a straight line defined by at least two points, including a first upper point having a Δ of 0.6% at a radius of 0 and a second upper point having a Δ of 0% at a radius of 14.25 μm. The lower boundary curve is a straight line defined by at least two points, including a first lower point having a Δ of 0.25% at a radius of 0 and a second lower point having a Δ of 0% at a radius of 6 μm.

Still more preferably, $AOEA_{L01}$ and $AOEA_{L02}$ are not less than 180 μm² at the Brillouin frequency of the optical fiber, and yet more preferably, $AOEA_{L01}$ and $AOEA_{L02}$ are not less than 190 μm² at the Brillouin frequency of the optical fiber.

The optical fiber preferably exhibits a zero dispersion (or dispersion zero or $\lambda_0$) wavelength less than 1480 nm, more preferably less than 1400 nm, and most preferably less than 1340 nm.

In other preferred embodiments, the optical fiber has a zero dispersion at a wavelength below 1320 nm, more preferably in the range between 1290 and 1320 nm.

Preferably, the optical fiber has a dispersion of between 15 and 21 ps/nm-km at a wavelength of 1550 nm. In some preferred embodiments, the optical fiber has a dispersion of between 16 and 18 ps/nm-km at a wavelength of 1550 nm. In other preferred embodiments, the optical fiber has a dispersion of between 18 and 20 ps/nm-km at a wavelength of 1550 nm.

In some preferred embodiments, the optical fiber has an optical effective area at 1550 nm of greater than 95 $\mu m^2$. In other preferred embodiments, the optical fiber has an optical effective area of greater than 100 $\mu m^2$.

Preferably the optical fiber has pin array bending loss at 1550 nm of less than 15 dB, more preferably less than 10 dB.

In some preferred embodiments, the upper boundary curve is a straight line defined by at least two points, including a first upper point having a $\Delta$ of 0.5% at a radius of 0 and a second upper point having a $\Delta$ of 0% at a radius of 11.25 $\mu m$;

In preferred embodiments, the core comprises a first portion extending from the centerline to a radius of 1 $\mu m$, the first portion having a relative refractive index greater than 0.25% and less than 0.5%.

In some preferred embodiments, $d\Delta/dR$>−0.15%/$\mu m$ for all radii from r=0 to r=1 $\mu m$. Preferably, the absolute magnitude of the difference between $\Delta(r=0\ \mu m)$ and $\Delta(r=1\ \mu m)$ is less than 0.1%.

The core further preferably comprises a second portion surrounding and directly adjacent to the first portion, the second portion extending to a radius of 2.5 $\mu m$ and having $\Delta$ between 0.20% and 0.45%. In preferred embodiments, the second portion has a $\Delta$ between 0.3% and 0.45% for all radii between 1 and 1.5 $\mu m$. In other preferred embodiments, the second portion has a $\Delta$ between 0.2% and 0.35% for all radii between 1.5 and 2.5 $\mu m$.

The core further preferably comprises a third portion surrounding and directly adjacent to the second portion, the third portion extending to a radius of 4.5 $\mu m$ and having $\Delta$ between 0.15% and 0.35%. In preferred embodiments, the third portion has a $\Delta$ between 0.2% and 0.3% for all radii between 2.5 and 4.5 $\mu m$.

Preferably, the absolute magnitude of the difference in $\Delta$ between any radii in the third portion is less than 0.1%.

Preferably, the absolute magnitude of the difference in $\Delta$ between any radii between r=2.5 $\mu m$ and r=4.5 $\mu m$ is less than 0.1%.

The core further preferably comprises a fourth portion surrounding and directly adjacent to the third portion, the fourth portion extending to a radius of 6 $\mu m$ and having $\Delta$ between 0.1% and 0.3%. In preferred embodiments, the fourth portion has a $\Delta$ between 0.2% and 0.3% for all radii between 4.5 and 5 $\mu m$. In other preferred embodiments, the fourth portion has a $\Delta$ between 0.15% and 0.3% for all radii between 5 and 6 $\mu m$. In some preferred embodiments, The core segment further preferably comprises a fifth portion surrounding and directly adjacent to the fourth portion, the fifth portion extending to a radius of 9 $\mu m$ and having $\Delta$ between 0.0% and 0.15%.

In preferred embodiments, $\Delta(r=5.5\ \mu m)$>0.1%. Preferably, $\Delta(r=6\ \mu m)$>0%.

In preferred embodiments, $A_{L01}$ and $A_{L02}$ are less than 400 $\mu m^2$.

In preferred embodiments, 0.5<$AOEA_{L01}/AOEA_{L02}$<2, more preferably 0.6<$AOEA_{L01}/AOEA_{L02}$<1.5.

Preferably, the outermost radius of the core, $r_{CORE}$, is greater than 6 $\mu m$, more preferably greater than 6 $\mu m$ and less than 15 $\mu m$, even more preferably greater than 6 $\mu m$ and less than 12 $\mu m$. In preferred embodiments, $r_{CORE}$ is between 6 $\mu m$ and 10 $\mu m$.

In other preferred embodiments, the optical fiber comprises: a length; a core having a refractive index profile and a centerline, the core comprising a central region having a maximum relative refractive index $\Delta_{1MAX}$, an intermediate region surrounding and directly adjacent the central region, the intermediate region having a minimum relative refractive index $\Delta_{2MIN}$, and an outer region surrounding and directly adjacent the intermediate region, the outer region having a maximum relative refractive index $\Delta_{3MAX}$, wherein $\Delta_{1MAX}$>$\Delta_{2MIN}$ and $\Delta_{3MAX}$>$\Delta_{2MIN}$; and a cladding layer surrounding and directly adjacent the core; wherein the optical fiber has an attenuation at 1550 nm; wherein the refractive index of the core is selected to provide an absolute SBS threshold in dB greater than about 9.3+log $[(1-e^{-(0.19)(50)/4.343})/(1-e^{-(\alpha)(L)/4.343})]$, wherein L is the length in km and $\alpha$ is the attenuation in dB/km at 1550 nm. Preferably, the refractive index of the core is selected to provide an optical effective area at 1550 nm greater than 80 $\mu m^2$. Preferably, the refractive index of the core is selected to provide a zero dispersion wavelength below 1400 nm. Preferably, the refractive index of the core is selected to provide a dispersion of greater than 15 ps/nm-km at a wavelength of 1550 nm. Preferably, the refractive index of the core is selected to provide a dispersion slope at 1550 nm of less than 0.07 ps/$nm^2$-km. In preferred embodiments, $\Delta_{1MAX}$>0.4%. Preferably, the absolute SBS threshold in dB greater than about 9.5+log $[(1-e^{-(0.19)(50)/4.343})/(1-e^{-(\alpha)(L)/4.343})]$. Preferably, the attenuation at 1550 nm is less than 0.23 dB/km, more preferably less than 0.22 dB/km, even more preferably less than 0.21 dB/km, still more preferably less than 0.2 dB/km. Preferably, $\Delta_{1MAX}$>0, $\Delta_{3MAX}$>0, and $\Delta_{2MIN}$>0. Preferably, the refractive index of the entire core relative to the cladding is greater than 0. Preferably, $|\Delta_{1MAX}-\Delta_{2MIN}|$>0.25%, more preferably $\Delta_{1MAX}-\Delta_{2MIN}$>0.25%. Preferably, $\Delta_{2MIN}$<0.4%, more preferably $\Delta_{2MIN}$ is between 0.1 and 0.4%. In some preferred embodiments, $\Delta_{2MIN}$ is between 0.1 and 0.3%. In other preferred embodiments, $\Delta_{2MIN}$ is between 0.2 and 0.3%. Preferably, $|\Delta_{3MAX}-\Delta_{2MIN}|$>0.10%, more preferably $\Delta_{3MAX}-\Delta_{2MIN}$>0.10%. In preferred embodiments, $\Delta_{1MAX}$>0.4%, $\Delta_{1MAX}-\Delta_{2MIN}$>0.25%, $\Delta_{2MIN}$ is between 0.1 and 0.4%, and $\Delta_{3MAX}-\Delta_{2MIN}$>0.10%.

While the fibers in U.S. Pat. No. 6,490,356 and in U.S. Provisional Patent Application Ser. Nos. 60/467,676, 60/507,313, and 60/528,953 are preferred, other fibers could also be employed. Preferably, the optical fiber for the trunk optical fiber link (including its length) is selected such that the SBS threshold of the fiber satisfies the following inequality:

$$P_{th} > \frac{\alpha A_{eff}}{g_B} \gamma_B \qquad (1)$$

wherein $$g_B = \frac{\tilde{g}_B(\nu)}{K(1 + \Delta\nu/\Delta\nu_B)},$$

$\tilde{g}_B(v)$ is Brillouin gain coefficient measured in m/W, $1 \leq K \leq 2$ is the polarization factor, $\Delta v$ and $\Delta v_B$ are the full widths at half maximum (FWHM) of the laser source and of the Brillouin gain, respectively; wherein $\alpha$ is the fiber loss coefficient (attenuation), and $A_{\text{eff}}$ is the fiber's effective area; wherein the dimensionless parameter $\gamma_B$ is found as a solution of the following equation:

$$\frac{\exp|-\gamma_B(1-e^{-\alpha L})|}{\left(\frac{1}{\gamma_B}+e^{-\alpha L}\right)}\gamma_B^{3/2}\sqrt{1-e^{-\alpha L}} = C; \quad (2)$$

wherein L is the fiber length and the constant C is given by $$C = \sqrt{\pi}\,kT\frac{v_s}{v_a}\Delta v_B\frac{g_B}{\alpha A_{\text{eff}}}; \quad (3)$$

and wherein T is the fiber temperature, k is the Boltzmann constant, $v_s$ is the signal frequency, and $v_a \approx 11$ GHz is the frequency difference between the Stokes wave and the signal wave. See *J. Lightwave Technol.*, vol. 20, pp. 1635-1643, (2002).

Stimulated Brillouin scattering (SBS) can be measured by a measurement system that records input power ($P_{in}$) and backscattered power ($P_{bs}$) as input power is varied over a defined range of input powers. Various systems and/or methods of determining the SBS threshold of an optical fiber could be used to characterize the fiber. One preferred method and system are disclosed herein.

Figure 2C:
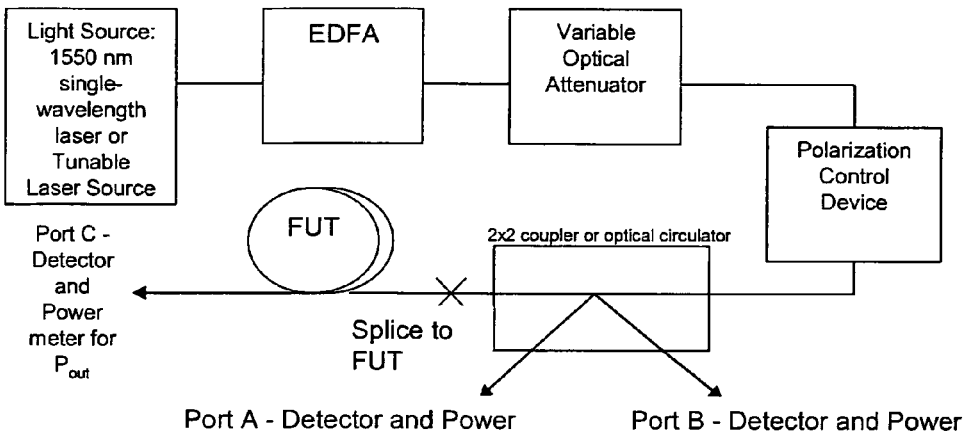
FIG. 2C is a schematic of a representative measurement system for measuring SBS threshold.

The measurement system disclosed herein comprises a light source, an erbium-doped fiber amplifier (EDFA), a variable optical attenuator (VOA), a polarization controller, an optical power routing device such as a two-by-two coupler or an optical circulator, and several optical power detectors and power meters. Single-mode patchcords with FC/APC connectors join these components. A representative measurement system is shown in FIG. 2C.

The light source, which may be a tunable or single-wavelength continuous wave laser, has a very narrow spectral width, about 150 kHz or less. The wavelength is preferably centered around 1550 nm, but can vary within the gain band of the EDFA. An EDFA is used to amplify the optical signal to power levels that can induce SBS in the fiber under test. A variable optical attenuator (VOA) is used to vary the optical power that is launched into the fiber under test. The VOA is selected to allow sufficiently fine step sizes and sufficient range to allow the measurement of input power and backscattered power across a broad range of input powers. A polarization control device is preferably used to establish 100% degree of polarization and a stable state of polarization. A two-by-two directional coupler or optical circulator directs power to the fiber under test and supports the monitoring of backscattered power (Port B) and/or input power (Port A). The fiber under test (FUT) is connected to the coupler or circulator with a fusion splice or other reflectionless connection device or method. A third detector may be used to monitor output power at Port C. Unless otherwise noted herein, SBS threshold values reported herein correspond to subjecting the optical fiber to the output of a continuous wave laser having a very narrow spectral width, about 150 kHz or less. Higher threshold values may be obtained for the same fiber when subjected to the output of sources having dithered or wider spectral widths. SBS threshold values reported herein correspond to optical fibers having a length of about 50 km, unless otherwise noted. It should be understood that the SBS threshold measurements could be performed on different lengths of fiber.

To conduct a measurement, a fiber is spliced into the system and the coupler taps are connected to the optical power detectors. The laser is activated and the EDFA yields a fixed output power. The VOA attenuation is stepped across a selected range in small increments, from a high inserted loss value to zero. For example, in one embodiment the step size is 0.1 dB and the scan range is 20 dB.

Reference measurement is conducted to obtain the actual input power. Although the input power is monitored during this process, the reference measurement allows a determination of actual input power without having to account for polarization dependent loss (PDL) and splice loss. This measurement is conducted on a two-meter sample of the fiber under test. The fiber is cutback and connected to Port C. The VOA scan is repeated over the same range, and the reference input power is recorded at Port C. These power values are used as the input powers of record. The input power and backscattered power level are recorded at each step (see curve P in FIG. 2D).

Figure 2D:
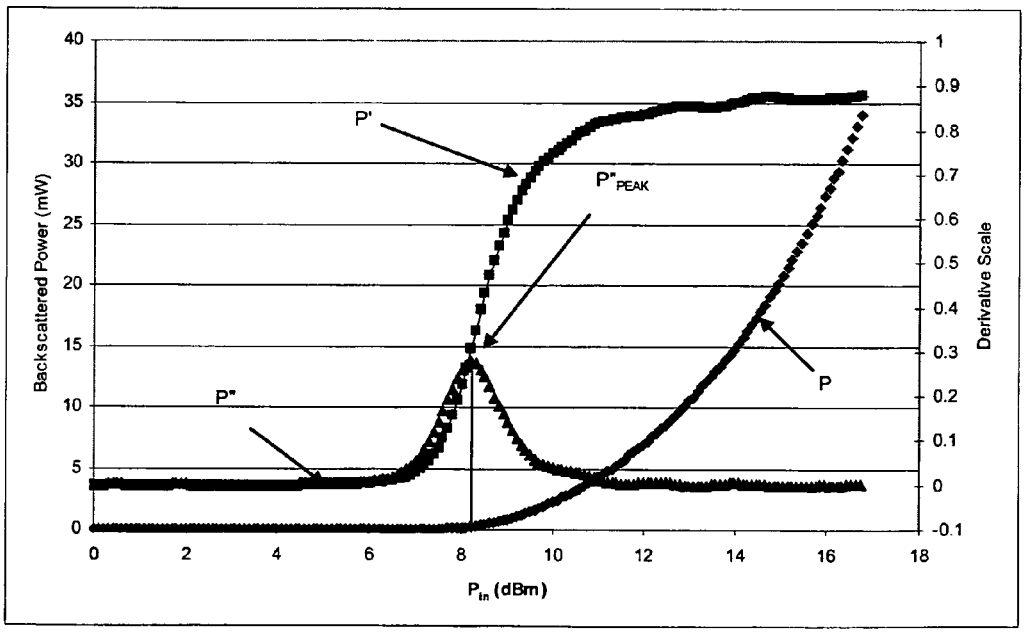
FIG. 2D is a plot of backscattered power versus input power, and its first and second derivatives for a representative optical fiber SNS threshold measurement.

When the scans are completed, first and second derivatives of the curve are calculated. The data set are preferably smoothed prior to calculating the first and second derivatives. The absolute SBS threshold is herein defined at the point at which the second derivative is maximum, which represents the point at which the rate of change of backscattered power in mW with respect to the change in input power (in mW) has reached a maximum. An illustrative plot of measured data (curve P) and the first and second derivatives (curve P' and P'', respectively) are presented in FIG. 2D. Curve P' is then the first derivative of backscattered power in mW with respect to input power in mW. Curve P'' is the second derivative of backscattered power in mW with respect to input power in mW. In FIG. 2D, the abscissa of the peak $P''_{PEAK}$ of curve P'' is the absolute SBS threshold, SBSt, in dB (e.g. 8.22 dB in FIG. 2D). That is, the input power at which the second derivative is a maximum is defined as the absolute SBS threshold for the fiber.

As reported herein, SBS threshold values were obtained with a polarization control device that establishes a fixed polarization state. However, in an alternate embodiment of the system and/or method for measuring SBS threshold, the SBS threshold could also be measured with a polarization randomizer or scrambler. The use of a polarization randomizer would increase the measured SBSt values for a given optical fiber by a factor of approximately 1.5 when compared to the SBSt value obtained with a fixed polarization state (100% degree of polarization and constant state of polarization).

Comparative SBS threshold values reported herein, such as SBS threshold improvement over a representative SMF-28e™ optical fiber manufactured by Corning Incorporated which has an attenuation similar to the attenuation of the optical fibers disclosed herein, compare the SBS threshold of different fibers measured in the same way (i.e. by the same method, and measurement system if measurement data is used). Thus, even though various SBS threshold measurement methods (and systems) may exist, the comparative values obtained from two different fibers according to the same method should be substantially similar to comparative values obtained from those fibers utilizing a different method.

The SBS threshold varies with the length and attenuation of the fiber under test. Generally, a very short length of an optical fiber will tend to have a higher SBS threshold value than a very long length of the same fiber. Also, generally, a length of one optical fiber having a higher attenuation will tend to have a higher SBS threshold value than the same length of another similar optical fiber having a lower attenuation. An approximate analytical expression is given in "Raman and Brillouin Non-Linearities in Broadband WDM-Overlay Single Fiber PONs," G. H. BuAbbud et al., ECOC 2003:

$$P_{th}(L) \approx 21 \frac{\alpha A_{eff}}{g_B^{eff} [1 - \exp(-\alpha L)]},$$

where $g_B^{eff}$ is the effective Brillouin gain coefficient, $\alpha$ is the attenuation, L is the fiber length, $A_{eff}$ is the optical effective area. In this simple approximation, the SBS threshold is inversely proportion to the effective length of the fiber. Thus, if the measured threshold for a length $L_1$ is $P_1$, then the threshold at length $L_2$ is $$P_2(dB) \cong P_1(dB) + 10 \log\left[\frac{1 - \exp(-\alpha L_1)}{1 - \exp(-\alpha L_2)}\right].$$

For example, the values of SBS threshold reported herein correspond to fibers having a length ($L_1$) of about 50 km and an attenuation at 1550 nm of about 0.19 dB/km. Thus, the SBS threshold $P_2$ for an optical fiber of the type disclosed herein having a length $L_2$ and attenuation $\alpha_2$ can be determined from:

$$P_2(dB) \cong P_1(dB) + 10 \log\left[\frac{1 - \exp(-(0.19 * 50.5))}{1 - \exp(-\alpha L_2)}\right].$$

Preferably, the optical fiber disclosed herein has a silica-based core and cladding. In preferred embodiments, the cladding has an outer diameter of about 125 μm. Preferably, the outer diameter of the cladding has a constant diameter along the length of the optical fiber. In preferred embodiments, the refractive index of the optical fiber has radial symmetry. Preferably, the core has a constant diameter along the length of the optical fiber.

Figure 3:
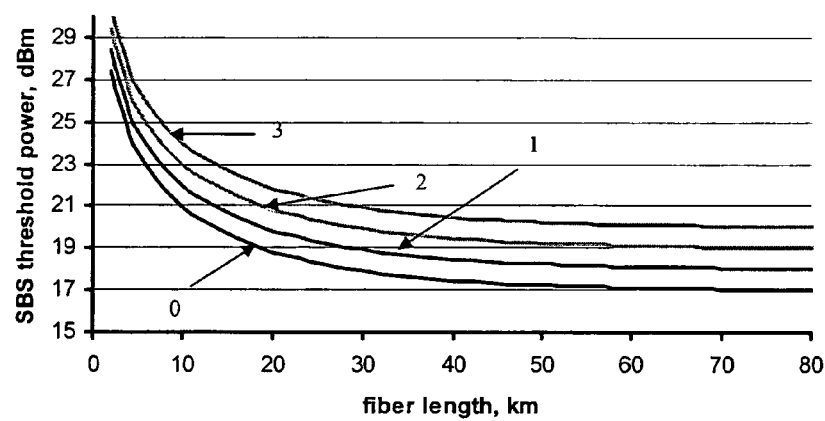
FIG. 3 shows a graphical representation of the SBS threshold versus fiber length of optical fiber suitable for use as disclosed herein.

FIG. 3 shows the calculated SBS threshold plotted versus optical fiber path length for optical fibers with different inherent SBS thresholds. The SBS-suppression capability of an analog source is typically quoted for a 50 km sample of standard single mode fiber, such as Corning SMF-28e® fiber. These fibers typically have an SBS threshold, for a representative fiber length of 50 km and an attenuation at 1550 nm of about 0.19 dB/km, that ranges from about 7 dBm with a CW narrow-linewidth source to approximately 17 dBm with a source that is strongly dithered.

FIG. 4 shows the measured reflected power as a function of input power for three optical fibers with lengths of about 50 km. Curve 5 corresponds to standard single mode fiber. Curves 6 and 7 correspond to fibers which exhibit SBS threshold increases above standard single mode fiber of 2.5 and 3.9 dBm, respectively, such as those disclosed in U.S. Pat. No. 6,490,356 and in U.S. Provisional Patent Application Ser. Nos. 60/467,676, 60/507,313, and 60/528,953.

Preferably, the optical fiber in the trunk optical fiber link 20 has an SBS threshold that is at least 1 dB higher than that of standard single mode fiber, more preferably at least 2 dB higher, and even more preferably at least 3 dB higher. For access/CATV network applications, preferred optical fiber has an SBS threshold that is at least 2 dB higher than that of standard single mode fiber.

Curve 0 in FIG. 3 corresponds to standard single mode fiber, in particular Corning's SMF-28e™. Curves 1, 2 and 3 of FIG. 3 correspond to fibers having respective 1 dB, 2 dB and 3 dB increases in the SBS threshold of the fiber over standard single mode fiber. FIG. 3 shows that incremental 1 dB increases in the SBS threshold of the optical fiber result in available optical fiber path lengths of the trunk optical fiber link or feeder line 20 of 10 km, 14 km and 18 km, respectively, for the same SBS threshold power of 22 dBm.

Operation below the SBS threshold of the optical fiber in trunk line or feeder line 20 is preferred. Preferably, the maximum optical launch power of the optical signal launched into or entering the optical fiber in trunk line or feeder line 20 is at least 1 dB below the actual SBS threshold of the optical fiber in the trunk link or feeder line 20. More preferably, the maximum optical launch power is at least 2 dB below the actual SBS threshold of the optical fiber in the trunk link or feeder line 20. Even more preferably, the maximum optical launch power is at least 3 dB below the actual SBS threshold of the optical fiber in the trunk link or feeder line 20.

For example, in one preferred embodiment, an 18 dBm source is preferably used with fiber having an SBS threshold of at least 20 dBm. Referring to FIG. 3, while the optical fiber path length of the trunk link or feeder line 20 would be restricted to less than about 13 km for an 18 dBm source transmitting through standard single mode fiber, larger optical fiber path lengths of the trunk link or feeder line 20 can be attained in the system or network as disclosed herein; specifically, the fibers in curves 1, 2 and 3 permit optical fiber path lengths of up to 18, 28 and more than 80 km, respectively. Thus, the reach of the network 16 can be increased over, for example, a network using standard single mode fiber such as Corning Incorporated SMF-28® or SMF-28e™ optical fiber in the feeder line.

Referring again to FIG. 3, a 19 dBm source is preferably used with fiber having an SBS threshold of at least 21 dBm. While the optical fiber path length of the trunk link or feeder line 20 would be restricted to less than about 10 km for a 19 dBm source transmitting through standard single mode fiber, larger optical fiber path lengths of the trunk link or feeder line 20 can be attained in the system or network as disclosed herein; specifically, the fibers in curves 1, 2 and 3 permit optical fiber path lengths of up to 13, 18 and 24 km, respectively.

As a further example and referring again to FIG. 3, a 20 dBm source is preferably used with fiber having an SBS threshold of at least 22 dBm. While the optical fiber path length of the trunk link or feeder line 20 would be restricted to less than about 7.5 km for a 20 dBm source transmitting through standard single mode fiber, larger optical fiber path lengths of the trunk link 20 can be attained in the system or network as disclosed herein; specifically, the fibers in curves 1, 2 and 3 permit optical fiber path lengths of up to 10, 13 and 18 km, respectively.

In a first set of preferred embodiments, an optical communication system is disclosed herein comprising: an optical signal source (located in the central office CO at a central terminal or head end) 12 capable of providing an optical signal at an output power of greater than 17 dBm; a plurality of remote terminals, wherein at least one of the remote terminals comprises a receiver; and an optical signal distribution network connecting the optical signal source to the receiver. The optical signal distribution network comprises a primary splitter optically connected to the optical signal source by a trunk optical fiber link or feeder line, wherein the primary splitter is capable of splitting the optical signal to at least 2 downstream paths. In a preferred embodiment, the primary splitter is situated remotely from, i.e. a physical distance away from the central office, preferably beyond 500 meters. The feeder line has an optical fiber path length greater than 5 km (which may be greater than or equal to the physical distance extending between the central office and the associated primary splitter), the optical signal is capable of being launched into the feeder line at a launch power greater than 17 dBm, and the system parameters are selected so that the optical signal generates a maximum reflected power in the feeder line less than 30 dB below the output power when the launch power of the optical signal entering the feeder line is greater than 17 dBm.

System parameters include the output power of the optical signal source, signal phase modulation, signal dithering, bit rate, and optical fiber characteristics such as length, attenuation, and SBS threshold.

In one preferred embodiment of the first set of preferred embodiments, the output power of the optical signal leaving the optical signal source is greater than 18 dBm. In another preferred embodiment, the output power is greater than 19 dBm. In yet another preferred embodiment, the output power is greater than 20 dBm. In still another preferred embodiment, the output power is greater than 21 dBm. In another preferred embodiment, the output power is greater than 23 dBm.

In some preferred embodiments, no components are optically connected between the optical signal source and the entrance to the feeder line into which the optical signal from the optical signal source is launched. In other preferred embodiments, no passive components are optically connected between the optical signal source and the entrance to the feeder line into which the optical signal from the optical signal source is launched. In yet preferred embodiments, one or more components, such as a multiplexer/demultiplexer, are optically connected between the optical signal source and the entrance to the feeder line into which the optical signal from the optical signal source is launched.

In one preferred embodiment of the first set of preferred embodiments, the launch power of the optical signal entering, or being launched into, the feeder line is greater than 18 dBm. In another preferred embodiment, the launch power of the optical signal entering, or being launched into, the feeder line is greater than 19 dBm. In yet another preferred embodiment, the launch power of the optical signal entering, or being launched into, the feeder line is greater than 20 dBm. In still another preferred embodiment, the launch power of the optical signal entering, or being launched into, the feeder line is greater than 21 dBm. In another preferred embodiment, the launch power is greater than 23 dBm.

In one preferred embodiment of the first set of preferred embodiments, the feeder line has an optical fiber path length greater than 7 km. In another preferred embodiment, the feeder line has an optical fiber path length greater than 10 km. In yet another preferred embodiment, the feeder line has an optical fiber path length greater than 15 km.

In one preferred embodiment of the first set of preferred embodiments, the launch power of the optical signal entering the feeder line is greater than 19 dBm, and the primary splitter is capable of splitting the optical signal to at least 4 downstream paths. In another preferred embodiment, the launch power is greater than 20 dBm, and the primary splitter is capable of splitting the optical signal to at least 4 downstream paths.

In a second set of preferred embodiments, an optical communication system is disclosed herein comprising: an optical signal source, in a central office, capable of providing an optical signal at an output power of the optical signal leaving the optical signal source of greater than 17 dBm; a plurality of remote terminals, wherein at least one of the remote terminals comprises a receiver; and an optical signal distribution network connecting the optical signal source to the receiver. The optical signal distribution network comprises: a primary splitter optically connected to the optical signal source by a feeder line, wherein the launch power of the optical signal entering the feeder line is greater than 17 dBm, wherein the feeder line has an optical fiber path length greater than 5 km, wherein the primary splitter is capable of splitting the optical signal to at least 4 downstream paths; and a plurality of intermediate splitters optically connected to the primary splitter by respective distribution lines, wherein at least one of the intermediate splitters is capable of splitting the optical signal into at least 2 downstream paths. The system parameters are selected so that the optical signal generates a maximum reflected power less than 30 dB below the launch output power of the optical signal entering the feeder line when the launch power is greater than 17 dBm.

In one preferred embodiment of the second set of preferred embodiments, the output power of the optical signal leaving the optical signal source is greater than 18 dBm and the launch power of the optical signal entering the feeder line is greater than 18 dBm. In another preferred embodiment, the output power is greater than 19 dBm and the launch power of the optical signal entering the feeder line is greater than 19 dBm. In yet another preferred embodiment, the output power is greater than 20 dBm and the launch power of the optical signal entering the feeder line is greater than 20 dBm. In still another preferred embodiment, the output power is greater than 21 dBm and the launch power of the optical signal entering the feeder line is greater than 21 dBm. In another preferred embodiment, the output power is greater than 23 dBm and the launch power of the optical signal entering the feeder line is greater than 23 dBm.

In one preferred embodiment of the second set of preferred embodiments, the feeder line has an optical fiber path length greater than 7 km. In another preferred embodiment, the feeder line has an optical fiber path length greater than 10 km. In yet another preferred embodiment, the feeder line has an optical fiber path length greater than 15 km.

In a preferred embodiment of the second set of preferred embodiments, the output power of the optical signal leaving the optical signal source is greater than 19 dBm, the launch power of the optical signal entering the feeder line is 19 dBm, and the primary splitter is capable of splitting the optical signal to at least 4 downstream paths. In another preferred embodiment, the output power is greater than 20 dBm, the launch power of the optical signal entering the feeder line is 20 dBm, and the primary splitter is capable of splitting the optical signal to at least 4 downstream paths.

In a preferred embodiment of the second set of preferred embodiments, the at least one of the intermediate splitters is capable of splitting the optical signal into at least 4 downstream paths. In another preferred embodiment, the at least one of the intermediate splitters is capable of splitting the optical signal into at least 8 downstream paths.

In a preferred embodiment of the second set of preferred embodiments, the optical signal is split only twice between the central office and the plurality of remote terminals. In another preferred embodiment, the optical signal is split only three times between the central office and the plurality of remote terminals.

In a third set of preferred embodiments, an optical communication system is disclosed herein comprising: an optical signal source in a central office, capable of providing an optical signal at an output power of the optical signal leaving the optical signal source of greater than 17 dBm; a plurality of remote terminals, wherein at least one of the remote terminals comprises a receiver; and an optical signal distribution network connecting the optical signal source to the receiver, the optical signal distribution network comprising a primary splitter optically connected to the optical signal source by a feeder line, wherein the launch power of the optical signal entering the feeder line is greater than 17 dBm, wherein the feeder line has an optical fiber path length greater than 5 km, wherein the primary splitter is capable of splitting the optical signal to at least 4 downstream paths. The optical signal is split only once between the central office and the plurality of remote terminals, and the system parameters are selected so that the optical signal generates a maximum reflected power less than 30 dB below the launch power of the optical signal entering the feeder line when the launch power is greater than 17 dBm.

In a preferred embodiment of the third set of preferred embodiments, the primary splitter is capable of splitting the optical signal to at least 32 downstream paths.

In one preferred embodiment of the third set of preferred embodiments, the output power of the optical signal leaving the optical signal source is greater than 18 dBm and the launch power of the optical signal entering the feeder line is greater than 18 dBm. In another preferred embodiment, the output power is greater than 19 dBm and the launch power of the optical signal entering the feeder line is greater than 19 dBm. In yet another preferred embodiment, the output power is greater than 20 dBm and the launch power of the optical signal entering the feeder line is greater than 20 dBm. In still another preferred embodiment, the output power is greater than 21 dBm and the launch power of the optical signal entering the feeder line is greater than 21 dBm. In another preferred embodiment, the output power is greater than 23 dBm and the launch power of the optical signal entering the feeder line is greater than 23 dBm.

In one preferred embodiment of the third set of preferred embodiments, the feeder line has an optical fiber path length greater than 7 km. In another preferred embodiment, the feeder line has an optical fiber path length greater than 10 km. In yet another preferred embodiment, the feeder line has an optical fiber path length greater than 15 km.

In a one preferred embodiment of the third set of preferred embodiments, the output power of the optical signal leaving the optical signal source is greater than 19 dBm the launch power of the optical signal entering the feeder line is greater than 19 dBm, and the primary splitter is capable of splitting the optical signal to at least 4 downstream paths. In another preferred embodiment, the output power is greater than 20 dBm the launch power of the optical signal entering the feeder line is greater than 20 dBm, and the primary splitter is capable of splitting the optical signal to at least 4 downstream paths.

In a fourth set of preferred embodiments, an optical communication system is disclosed herein comprising: an optical signal source, in a central office, capable of providing an optical signal at an output power of the optical signal leaving the optical signal source of greater than 20 dBm; a plurality of remote terminals, wherein at least one of the remote terminals comprises a receiver; and an optical signal distribution network connecting the optical signal source to the receiver, the optical signal distribution network comprising a primary splitter optically connected to the optical signal source by a feeder line, wherein the feeder line has an optical fiber path length greater than 5 km, wherein the launch power of the optical signal entering the feeder line is greater than 20 dBm, and wherein the primary splitter is capable of splitting the optical signal to at least 4 downstream paths. The optical signal is split only once between the central office and the plurality of remote terminals, and the system parameters are selected so that the optical signal generates a maximum reflected power less than 30 dB below the launch power of the optical signal entering the feeder line when the launch power of the optical signal is greater than 20 dBm.

In one preferred embodiment of the fourth set of preferred embodiments, the output power of the optical signal leaving the optical signal source is greater than 21 dBm, and the launch power into the feeder line is greater than 21 dBm. In another preferred embodiment, the output power is greater than 23 dBm, and the launch power into the feeder line is greater than 23 dBm.

In one preferred embodiment of the fourth set of preferred embodiments, the trunk optical fiber link has an optical fiber path length greater than 7 km. In another preferred embodiment, the trunk optical fiber link has an optical fiber path length greater than 10 km. In yet another preferred embodiment, the trunk optical fiber link has an optical fiber path length greater than 15 km.

In a fifth set of preferred embodiments, an optical communication system is disclosed herein comprising: an optical signal source in a central office, capable of providing an optical signal at an output power of the optical signal leaving the optical signal source of greater than 20 dBm; a plurality of remote terminals, wherein at least one of the remote terminals comprises a receiver; and an optical signal distribution network connecting the optical signal source to the receiver, the optical signal distribution network comprising a primary splitter optically connected to the optical signal source by a feeder line, wherein the feeder line has an optical fiber path length greater than 20 km, wherein the launch power of the optical signal entering the feeder line is greater than 20 dBm, and wherein the primary splitter is capable of splitting the optical signal to at least 32 downstream paths. The optical signal is split only once between the central office and the plurality of remote terminals, and the system parameters are selected so that the optical signal generates a maximum reflected power less than 30 dB below the launch power of the optical signal entering the feeder line when the launch power is greater than 20 dBm.

In one preferred embodiment of the fifth set of preferred embodiments, the output power of the optical signal leaving the optical signal source is greater than 21 dBm and the launch power of the optical signal entering the feeder line is greater than 21 dBm. In another preferred embodiment, the output power is greater than 23 dBm and the launch power of the optical signal entering the feeder line is greater than 23 dBm.

In a sixth set of preferred embodiments, an optical communication system is disclosed herein comprising: an optical signal source in a central office capable of providing an optical signal at an output power of the optical signal leaving the optical signal source of greater than 17 dBm; and an optical signal distribution network comprising a primary splitter optically connected to the optical signal source by a feeder line, wherein the primary splitter is capable of splitting the optical signal to at least 2 downstream paths. The system parameters are selected so that the optical signal generates a maximum reflected power less than 30 dB below the output power of the optical signal leaving the optical signal source when the launch power is greater than 17 dBm, and the optical signal is not dithered.

In a preferred embodiment of the sixth set of preferred embodiments, the feeder line has an optical fiber path length greater than 5 km.

In one preferred embodiment of the sixth set of preferred embodiments, the output power of the optical signal leaving the optical signal source is greater than 18 dBm and the launch power of the optical signal entering the feeder line is greater than 18 dBm. In another preferred embodiment, the output power is greater than 19 dBm and the launch power of the optical signal entering the feeder line is greater than 19 dBm. In yet another preferred embodiment, the output power is greater than 20 dBm and the launch power of the optical signal entering the feeder line is greater than 20 dBm. In still another preferred embodiment, the output power is greater than 21 dBm and the launch power of the optical signal entering the feeder line is greater than 21 dBm. In another preferred embodiment, the output power is greater than 23 dBm and the launch power of the optical signal entering the feeder line is greater than 23 dBm.

In one preferred embodiment of the sixth set of preferred embodiments, the trunk optical fiber link has an optical fiber path length greater than 7 km. In another preferred embodiment, the trunk optical fiber link has an optical fiber path length greater than 10 km. In yet another preferred embodiment, the trunk optical fiber link has an optical fiber path length greater than 15 km.

In one preferred embodiment of the sixth set of preferred embodiments, the output power of the optical signal leaving the optical signal source is greater than 19 dBm, the launch power of the optical signal entering the feeder line is greater than 19 dBm, and the primary splitter is capable of splitting the optical signal to at least 4 downstream paths. In another preferred embodiment, the output power is greater than 20 dBm, the launch power of the optical signal entering the feeder line is greater than 20 dBm, and the primary splitter is capable of splitting the optical signal to at least 4 downstream paths.

In a seventh set of preferred embodiments, a communications network is disclosed herein comprising: a central terminal, in a central office, comprising a transmitter for generating an optical signal, wherein the central terminal is capable of providing an optical signal having an output power of at least 20 dBm at a wavelength within an operating wavelength range; a plurality of remote terminals, wherein at least one of the remote terminals comprises a receiver for receiving the optical signal; and an optical network optically connecting the central terminal to the plurality of remote terminals, the optical network comprising a remote node containing a primary splitter and a plurality of optical fiber links including a feeder line connecting the central office to the primary splitter, wherein the trunk optical fiber link has an optical fiber length greater than 5 km, wherein the launch power of the optical signal is greater than 20 dBm wherein the primary splitter is capable of splitting the optical signal into at least 2 downstream paths, wherein the receiver is optically connected to at least one of the at least 2 downstream paths. The communications network parameters are selected to provide a CNR greater than 50 dBc in the operating wavelength range for substantially all channels with frequencies in the 45-560 MHz range when the launch power of the optical signal entering the feeder line is greater than 20 dBm In one preferred embodiment of the seventh set of preferred embodiments, the trunk optical fiber link or feeder line comprises a plurality of optical fibers. In another preferred embodiment, the trunk optical fiber link comprises an optical fiber cable. Preferably, the trunk optical fiber link consists of a single fiber type.

In another preferred embodiment of the seventh set of preferred embodiments, the optical network further comprises a plurality of primary splitters and a plurality of feeder line, and each primary splitter has a respective trunk optical fiber link or feeder line connecting the primary splitter to the central office. In one preferred embodiment, the operating wavelength is between about 1530 nm to about 1570 nm. In another preferred embodiment, the operating wavelength range extends from about 1545 nm to about 1555 nm.

In one preferred embodiment, the output power of the optical signal leaving the central terminal is greater than 21 dBm and the launch power of the optical signal entering the feeder line is greater than 21 dBm. In another preferred embodiment, the output power is greater than 23 dBm and the launch power of the optical signal entering the feeder line is greater than 23 dBm.

In one preferred embodiment, the trunk optical fiber link has an optical fiber path length greater than 7 km. In another preferred embodiment, the trunk optical fiber link has an optical fiber path length greater than 10 km. In yet another preferred embodiment, the trunk optical fiber link has an optical fiber path length greater than 15 km.

In an eighth set of preferred embodiments, a communications network is disclosed herein comprising: a central terminal, in a central office, comprising a transmitter for generating an optical signal; wherein the central terminal is capable of providing an optical signal having an output power of at least 19 dBm at a wavelength within an operating wavelength range; a plurality of remote terminals, wherein at least one of the remote terminals comprises a receiver for receiving the optical signal; and an optical network optically connecting the central terminal to the plurality of remote terminals, the optical network comprising a primary splitter and a plurality of optical fiber links including a feeder line connecting the central terminal to the primary splitter, wherein the trunk optical fiber link has an optical fiber length greater than 10 km, wherein the launch power of the optical signal entering the feeder line is greater than 19 dBm, wherein the primary splitter is capable of splitting the optical signal into at least 2 downstream paths, wherein the receiver is optically connected to at least one of the at least 2 downstream paths. The communications network parameters are selected to provide a CNR greater than 50 dBc in the operating wavelength range for substantially all channels with frequencies in the 45-560 MHz range when the launch power is greater than 19 dBm.

In one preferred embodiment of the eighth set of preferred embodiments, the trunk optical fiber link or feeder line has an optical fiber path length greater than 15 km.

In another preferred embodiment of the eighth set of preferred embodiments, the output power is greater than 20 dBm, the launch power of the optical signal entering the feeder line is greater than 20 dBm, and the primary splitter is capable of splitting the optical signal to at least 4 downstream paths.

In a ninth set of preferred embodiments, a method of transmitting optical signals is disclosed herein, the method comprising: optically connecting a central terminal in a central office to a plurality of remote terminals via a passive optical network comprising a primary splitter and a plurality of optical fiber links including a feeder line connecting the central office and the remote node and optically connecting the central terminal to the remote node and the remote node, wherein at least one of the remote terminals comprises a receiver; optically connecting the primary splitter to the receiver; and generating the optical signals at the central terminal at an output power of at least 20 dBm at a wavelength in an operating wavelength range, wherein the launch powers of the optical signals entering the feeder line are at least 20 dBm, and wherein the system parameters are selected to provide a CNR greater than 50 dBc for substantially all channels with frequencies in the 45-560 MHz range.

Preferably, the feeder line in the ninth set of preferred embodiments has an optical fiber path length greater than 5 km.

In a preferred embodiment of the ninth set of preferred embodiments, the optical fiber connecting the central terminal to the primary splitter is selected to exhibit a maximum reflected power which is 20 dBm less than the launch power of the optical signal entering the feeder line at the wavelength when the launch power is at least 20 dBm. In another preferred embodiment, the optical fiber connecting the transmitter to the primary splitter is selected to exhibit a maximum reflected power which is 23 dBm less than the launch power at the wavelength when the launch power is at least 20 dBm. In another preferred embodiment, the optical fiber connecting the central terminal to the primary splitter is selected to exhibit a maximum reflected power which is 30 dBm less than the launch power at the wavelength when the launch power is at least 20 dBm.

In one preferred embodiment of the ninth set of preferred embodiments, the output power of the optical signal leaving the central office is greater than 21 dBm. In another preferred embodiment, the output power is greater than 23 dBm.

In one preferred embodiment of the ninth set of preferred embodiments, the feeder line has an optical fiber path length greater than 7 km. In another preferred embodiment, the trunk optical fiber link has an optical fiber path length greater than 10 km. In yet another preferred embodiment, the trunk optical fiber link has an optical fiber path length greater than 15 km.

In a tenth set of preferred embodiments, an optical communication system is disclosed herein comprising: an optical signal source, in a central office, capable of providing an optical signal at an output power of greater than 18 dBm at a selected wavelength within an operating wavelength range; and an optical signal distribution network comprising a primary splitter optically connected to the optical signal source by a feeder line, wherein the primary splitter is capable of splitting the optical signal to at least 2 downstream paths, wherein the launch power of the optical signal entering the feeder line is greater than 18 dBm, and wherein the SBS threshold power of the trunk optical fiber link is greater than (a Aeff) $\gamma_B/g_B$ at the selected wavelength when the launch power is greater than 18 dBm.

Preferably, the feeder line in the tenth set of preferred embodiments has an optical fiber path length greater than 5 km. In a preferred embodiment, the trunk optical fiber link has an optical fiber path length greater than 7 km.

In one preferred embodiment of the tenth set of preferred embodiments, the output power of the optical signal leaving the optical signal source is greater than 19 dBm and the launch power of the optical signal entering the feeder line is greater than 19 dBm. In another preferred embodiment, the output power is greater than 20 dBm and the launch power of the optical signal entering the feeder line is greater than 20 dBm. In yet another preferred embodiment, the output power is greater than 21 dBm and the launch power of the optical signal entering the feeder line is greater than 21 dBm. In still another preferred embodiment, the output power is greater than 23 dBm and the launch power of the optical signal entering the feeder line is greater than 23 dBm.

In one preferred embodiment of the tenth set of preferred embodiments, the feeder line has an optical fiber path length greater than 10 km. In another preferred embodiment, the trunk optical fiber link has an optical fiber path length greater than 15 km.

In one preferred embodiment of the tenth set of preferred embodiments, the output power of the optical signal leaving the optical signal source is greater than 19 dBm, the launch power of the optical signal entering the feeder line is greater than 19 dBm, and the primary splitter is capable of splitting the optical signal to at least 4 downstream paths. In another preferred embodiment, the output power is greater than 20 dBm, the launch power of the optical signal entering the feeder line is greater than 20 dBm, and the primary splitter is capable of splitting the optical signal to at least 4 downstream paths.

In an eleventh set of preferred embodiments, an optical communication system is disclosed herein comprising: an optical signal source, in a central office, for providing an optical signal at an output power; a plurality of remote terminals, wherein at least one of the remote terminals comprises a receiver; and an optical signal distribution network connecting the optical signal source to the receiver, the optical signal distribution network comprising a primary splitter optically connected to the optical signal source by a feeder line, wherein the primary splitter is capable of splitting the optical signal to at least 2 downstream paths. The feeder line has an optical fiber path length greater than 5 km and the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than 20 dBm. Preferably, CNR is greater than 43 dBc and CSO is less than −58 dBc and CTB is less than −58 dBc for substantially all channels with frequencies in the 45-560 MHz range when the launch power of the optical signal entering the feeder line is greater than 20 dBm.

In one preferred embodiment, the launch power of the optical signal entering the feeder line is greater than 21 dBm (and CNR is greater than 43 dBc or CSO is less than −58 dBc or CTB is less than −58 dBc for substantially all channels with frequencies in the 45-560 MHz range when the output power of the optical signal leaving the optical signal source is greater than 21 dBm). More preferably, CNR is greater than 43 dBc and CSO is less than −58 dBc and CTB is less than −58 dBc for substantially all channels with frequencies in the 45-560 MHz range when the launch power of the optical signal entering the feeder line is greater than 21 dBm. In another preferred embodiment, the launch power is greater than 23 dBm (and CNR is greater than 43 dBc or CSO is less than −58 dBc or CTB is less than −58 dBc for substantially all channels with frequencies in the 45-560 MHz range when the output power of the optical signal leaving the optical signal source is greater than 23 dBm). More preferably, CNR is greater than 43 dBc and CSO is less than −58 dBc and CTB is less than −58 dBc for substantially all channels with frequencies in the 45-560 MHz range when the launch power of the optical signal entering the feeder line is greater than 23 dBm.

In a preferred embodiment, the feeder line has an optical fiber path length greater than 7 km. In another preferred embodiment, the trunk optical fiber link has an optical fiber path length greater than 10 km. In yet another preferred embodiment, the trunk optical fiber link has an optical fiber path length greater than 15 km.

In one preferred embodiment, the launch power of the optical signal entering the feeder line is greater than 21 dBm and the primary splitter is capable of splitting the optical signal to at least 4 downstream paths.

In a preferred embodiment, the optical signal distribution network further comprises at least one intermediate splitter optically connected to the primary splitter by respective branch optical fiber links or distribution lines.

In one preferred embodiment, the primary splitter is capable of splitting the optical signal to at least 4 downstream paths and the optical signal distribution network further comprises at least one intermediate splitter optically connected to the primary splitter by respective branch optical fiber links or distribution lines, wherein the at least one intermediate splitters is capable of splitting the optical signal into at least 2 downstream paths. In another preferred embodiment, the primary splitter is capable of splitting the optical signal to at least 4 downstream paths, and the optical signal is split only once between the central office and the plurality of remote terminals. In yet another preferred embodiment, the primary splitter is capable of splitting the optical signal to at least 32 downstream paths. In still another preferred embodiment, the primary splitter is capable of splitting the optical signal to at least 4 downstream paths, the optical signal is split only once between the central office and the plurality of remote terminals, and the system parameters are selected so that, in the operating wavelength range, CNR is greater than 43 dBc and CSO is less than −58 dBc and CTB is less than −58 dBc for substantially all channels with frequencies in the 45-560 MHz range when the launch power of the optical signal entering the feeder line is greater than 20 dBm.

In another preferred embodiment, the trunk optical fiber link or feeder line has an optical fiber path length greater than 20 km, the primary splitter is capable of splitting the optical signal to at least 32 downstream paths, and the optical signal is split only once between the central office and the plurality of remote terminals.

In a twelfth set of preferred embodiments, a communications network is disclosed herein comprising: a central terminal, in a central office, comprising a transmitter for generating an optical signal at a wavelength within an operating wavelength range, wherein the optical signal leaves the central terminal with an output power; a plurality of remote terminals, wherein at least one of the remote terminals comprises a receiver for receiving the optical signal; and an optical network optically connecting the central terminal to the plurality of remote terminals, the optical network comprising a primary splitter and a plurality of optical fiber links including a feeder line connecting the central terminal to the primary splitter, wherein the feeder line has an optical fiber length greater than 5 km, wherein the primary splitter is capable of splitting the optical signal into at least 2 downstream paths, wherein the receiver is optically connected to at least one of the at least 2 downstream paths, and wherein the communications network parameters are selected to provide a CNR greater than 50 dBc in the operating wavelength range for substantially all channels with frequencies in the 45-560 MHz range when the launch power of the optical signal entering the feeder line is greater than or equal to 23 dBm.

In a thirteenth set of preferred embodiments, a communications network is disclosed herein comprising: a central terminal, in a central office, for outputting an optical signal with an output power at a wavelength within an operating wavelength range; a plurality of remote terminals, wherein at least one of the remote terminals comprises a receiver for receiving the optical signal; and an optical network optically connecting the central terminal to the plurality of remote terminals, the optical network comprising a primary splitter and a plurality of optical fiber links including a trunk optical fiber link connecting the central terminal to the primary splitter, wherein the trunk optical fiber link has an optical fiber length greater than 10 km, wherein the primary splitter is capable of splitting the optical signal into at least 2 downstream paths, wherein the receiver is optically connected to at least one of the at least 2 downstream paths, and wherein the communications network parameters are selected to provide a CNR greater than 50 dBc in the operating wavelength range for substantially all channels with frequencies in the 45-560 MHz range when the output power of the optical signal leaving the central terminal is greater than or equal to 19 dBm.

In one preferred embodiment of the thirteenth set of preferred embodiments, the central terminal comprises a transmitter for generating the optical signal. In another preferred embodiment of the thirteenth set of preferred embodiments, the trunk optical fiber link has an optical fiber path length greater than 15 km.

In a fourteenth set of preferred embodiments, a method of transmitting optical signals is disclosed herein, the method comprising: optically connecting a central terminal in a central office to a plurality of remote terminals via a passive optical network comprising a primary splitter and a plurality of optical fiber links including a feeder line connecting the central office to the remote node and optically connecting the central terminal and the primary splitter, wherein at least one of the remote terminals comprises a receiver; optically connecting the primary splitter to the receiver; and generating the optical signals at the central terminal at an output power of at least 20 dBm at a wavelength in an operating wavelength range; wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than 20 dBm.

In one preferred embodiment of the fourteenth set of preferred embodiments, the feeder line has an optical fiber path length greater than 5 km. In another preferred embodiment of the fourteenth set of preferred embodiments, the optical fiber connecting the central terminal to the primary splitter is selected to exhibit a maximum reflected power which is 20 dBm less than the output power at the wavelength when the launch power into the feeder line is at least 20 dBm.

In a fifteenth set of preferred embodiments, an optical communication system is disclosed herein comprising: an optical signal source, in a central office, for providing an optical signal at an output power at a wavelength within an operating wavelength range; and an optical signal distribution network comprising a primary splitter optically connected to the optical signal source by a feeder line, wherein the primary splitter is capable of splitting the optical signal to at least 2 downstream paths; wherein the SBS threshold power of the trunk optical fiber link is greater than $(\alpha\ A_{\text{eff}})\ \gamma_B/g_B$ at the wavelength when the launch power of the optical signal entering the feeder line is greater than 18 dBm. In a preferred embodiment, the trunk optical fiber link or feeder line has an optical fiber path length greater than 5 km.

In a sixteenth set of preferred embodiments, an optical communication system is disclosed herein comprising: an optical signal source in a central office for providing an optical signal at an output power; a plurality of remote terminals, wherein at least one of the remote terminals comprises a receiver; and an optical signal distribution network optically connecting the optical signal source to the receiver, the optical signal distribution network comprising a primary splitter optically connected to the optical signal source by a trunk optical fiber link or feeder line, wherein the feeder line connects the central office to the remote node and the primary splitter is capable of splitting the optical signal to at least 2 downstream paths; wherein the trunk optical fiber link has an optical fiber path length greater than 5 km and a zero-dispersion wavelength less than 1400 nm, and the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than 18 dBm.

In one preferred embodiment, the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than 19 dBm. In another preferred embodiment, the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than 20 dBm. In yet another preferred embodiment, the system parameters are selected so that, in the operating wavelength range, CNR is greater than 43 dBc and CSO is less than −58 dBc for substantially all channels with frequencies in the 45-560 MHz range when the launch power is greater than 20 dBm. In another preferred embodiment, the system parameters are selected so that, in the operating wavelength range, CNR is greater than 43 dBc and CTB is less than −58 dBc for substantially all channels with frequencies in the 45-560 MHz range when the launch power is greater than 20 dBm. In still another preferred embodiment, the system parameters are selected so that, in the operating wavelength range, CSO is less than −58 dBc and CTB is less than −58 dBc for substantially all channels with frequencies in the 45-560 MHz range when the launch power is greater than 20 dBm. In another preferred embodiment, the system parameters are selected so that, in the operating wavelength range, CNR is greater than 43 dBc and CSO is less than −58 dBc and CTB is less than −58 dBc for substantially all channels with frequencies in the 45-560 MHz range when the launch power is greater than 20 dBm.

In another preferred embodiment, the feeder line has an optical fiber path length greater than 10 km. In yet another preferred embodiment, the trunk optical fiber link has an optical fiber path length greater than 12 km. In still another preferred embodiment, the trunk optical fiber link has an optical fiber path length greater than 13 km.

In another preferred embodiment, the trunk optical fiber link or feeder line has an optical fiber path length greater than 10 km, and the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than or equal to 19 dBm.

In yet another preferred embodiment, the trunk optical fiber link or feeder line has an optical fiber path length greater than 8 km, and the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than or equal to 20 dBm.

In still another preferred embodiment, the feeder line has an optical fiber path length greater than 6 km, and the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than or equal to 21 dBm.

In another preferred embodiment, the system parameters are selected so that, in the operating wavelength range, CNR is greater than 43 dBc or CSO is less than −58 dBc or CTB is less than −58 dBc for substantially all channels with frequencies in the 45-560 MHz range when the launch power of the optical signal entering the feeder line is greater than or equal to 23 dBm.

Referring again to FIG. 1, in one preferred embodiment, an optical communication system comprises a central office (CO) and a passive optical network 16. An OLT 12, which contains PON head-end terminal equipment is situated in the CO. Feeder line 20 connects primary splitter 24 to the CO. Primary splitter 24 is contained in Local Convergence Point (LCP) or remote node 25. Feeder line 20 optically connects OLT 12 to the primary splitter 24. Distribution line 26 connects remote node 25 to intermediate node 29 and optically connects the primary splitter 24 to the intermediate splitter 28. Intermediate splitter 28 is located at a Network Access Point (NAP). Drop lines 30 connect end users or subscribers at the ONTs. Drop lines 30 preferably have a macrobending loss of less than 3 dB/km, as measured by the pin array bend test or a 20 mm mandrel test, preferably both tests; preferably the macrobend loss is less than 3 dB/km for at least the last 100 meters of fiber path length for drop lines 30. The remote node and the ONTs are remotely located from the CO.

FIG. 5 illustrates another preferred embodiment of an optical communications system comprising a CO and a passive optical network 16. Feeder line 20 connects OLT 12 in the CO to the primary splitter 24 in remote node 25 and distribution lines 26 serve as drop lines by optically connecting the primary splitter 24 to the ONTs 14*x*. The primary splitter 24 and remote node 25 are remotely located from the CO.

Figure 6:
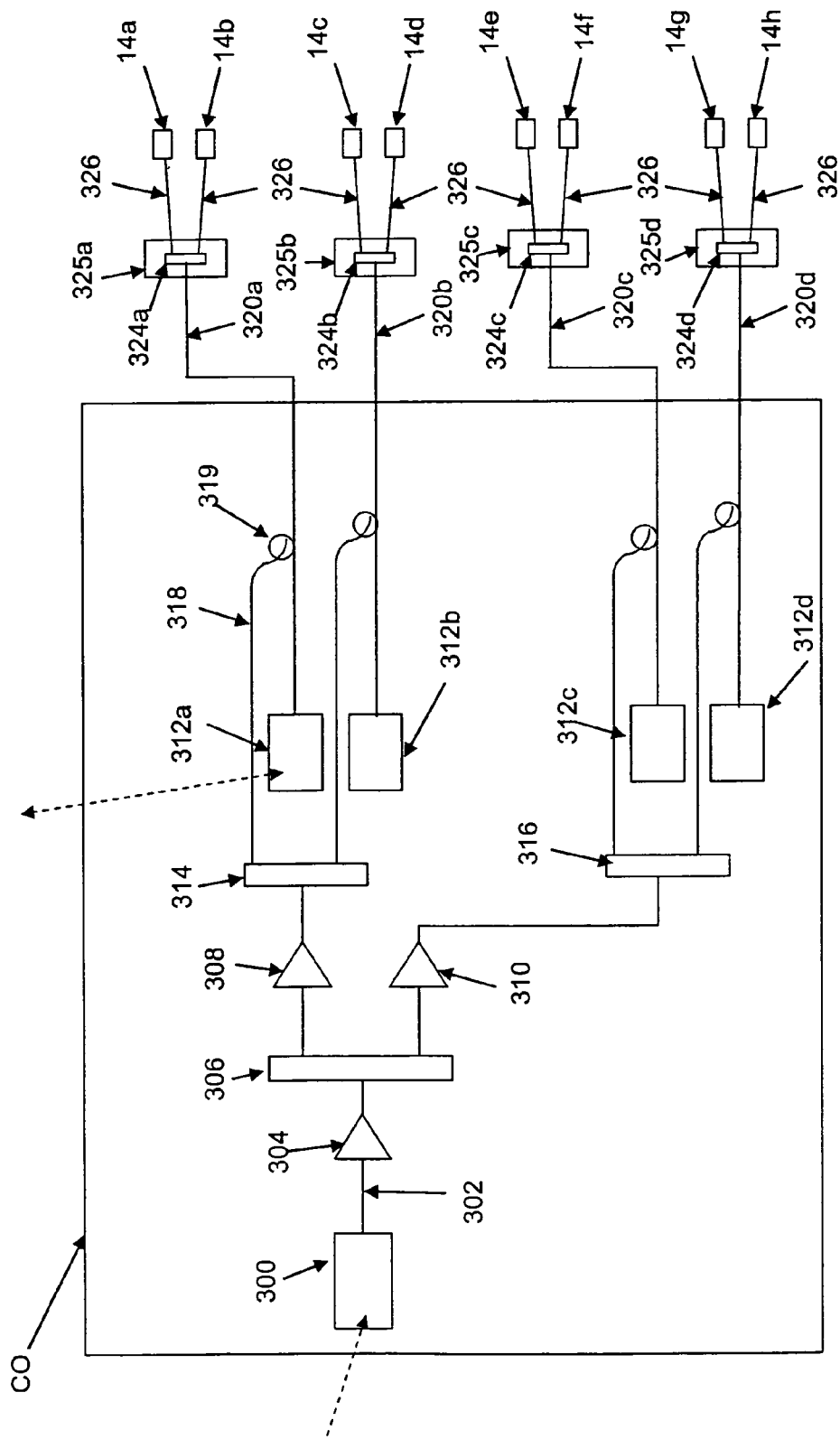
FIG. 6 schematically illustrates another preferred embodiment of an optical communication system comprising a central office (CO) and a plurality of passive optical networks connected thereto.

FIG. 6 illustrates another preferred embodiment of an optical communication system comprising a central office (CO) and a plurality of passive optical networks connected thereto. The CO serves as a hub and the PONs are provided to deliver a set of services such as voice, data and/or high speed interactive video, as well as other services, to subscribers, such as via ONT 14*a-h*. The delivered services can be a broadcast service, such that all subscribers can receive the same signal or information, or a switched service or narrowcast service where each subscriber receives an individually selected signal or information, such as telephony or voice services. The source 300 of broadcast signals or services can be provided by, for example, satellite, high speed link, pre-recording, on-site generation, or internet service provider (ISP), and the source outputs a modulated optical signal, such as a modulated broadband optical carrier signal, onto line 302. A plurality of broadcast sources 300 can be provided instead of a single source.

The modulated broadband optical signal is amplified by amplifier 304 and then split by splitter 306. The signal is then further amplified by optical amplifier 308 and 310 and further split by splitters 314 and 316. Splitters 306, 314 and 316 are preferably power splitters wherein each of the power splitters 306, 314 and 316 duplicates or replicates the input signal onto one or more output signals. For example, each of the output signals has identical modulated information and frequency content as the input signal, but each of the output signals is typically lower in power than the input signal.

For all embodiments herein, unless otherwise noted, all splitters can advantageously be power splitters (such as splitter 306). One or more WDM splitters may also be employed, either alone or in conjunction with one or more power splitters. Both power splitters and WDM splitters may be disposed within the same node. Preferably, all primary splitters are power splitters.

Splitters 314 and 316 each include multiple outputs which provide the broadcast signal over respective optical fiber lines 318.

The system may also include a plurality of optical couplers 319, which may be, for example, a WDM device, connected to respective lines 318 for optically connecting the broadcast broadband signal to respective feeder lines (e.g. 320a) that optically connect respective PON data transmitting and receiving equipment (e.g. 312a) to a respective primary splitter (e.g. 324a).

Preferably each remote node 325 includes a component that splits the optical signal(s) to one or more distribution lines 326. Preferably each remote node (e.g. 325a) includes a primary power splitter (e.g. 324a) that sends a fraction of the power of the signal to each of the N distribution lines connected to that remote node. Alternatively, or in addition, one or more remote nodes (e.g. 325a) includes a WDM splitter that directs one or more wavelengths to a selected distribution line 326. Each of the remote nodes is a spatial distance from the CO.

Figure 7:
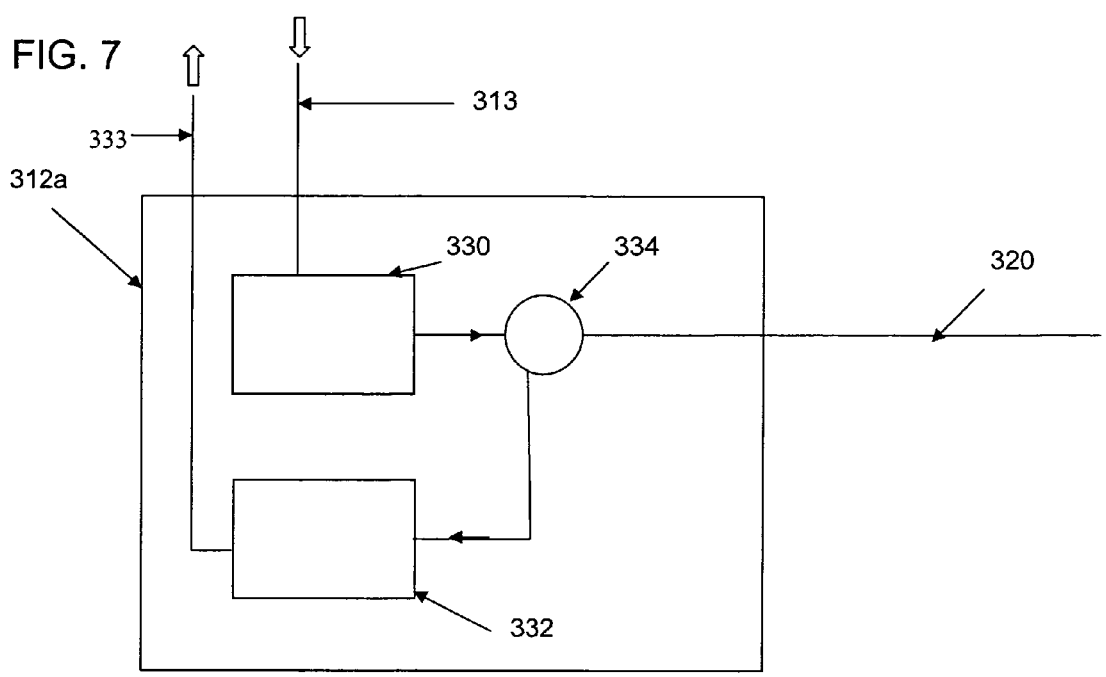
FIG. 7 is a more detailed schematic illustration of an embodiment of PON terminal equipment that can be used in the system of FIG. 6.

FIG. 7 schematically illustrates an enlarged view of FIG. 6 showing a representative embodiment of PON data transmitting and receiving equipment (e.g. 312a) that preferably receives voice, data and/or video signals or the like, preferably by an input line 313, to be delivered to a primary splitter (e.g. 324a) by a feeder line (e.g. 320a) and then eventually to one or more subscribers. PON data transmitting and receiving equipment (e.g. 312a) preferably includes an optical transmitter 330, such as a laser, LED or other optical service, an optional receiver 332 and optical coupler 334. Transmitter 330 and receiver 332 preferably can perform an electrical-to-optical and optical-to-electrical signal conversion, respectively. Transmitter 330 generates a modulated optical signal based upon the signals provided by input line 313 to provide services to subscriber. Receiver 332 receives digital signals such as data and returns the signals by output line 333. PON data transmitting and receiving equipment (e.g. 312a) can also include additional optical components, such as filters, isolators, and/or multiplexers.

Figure 8:
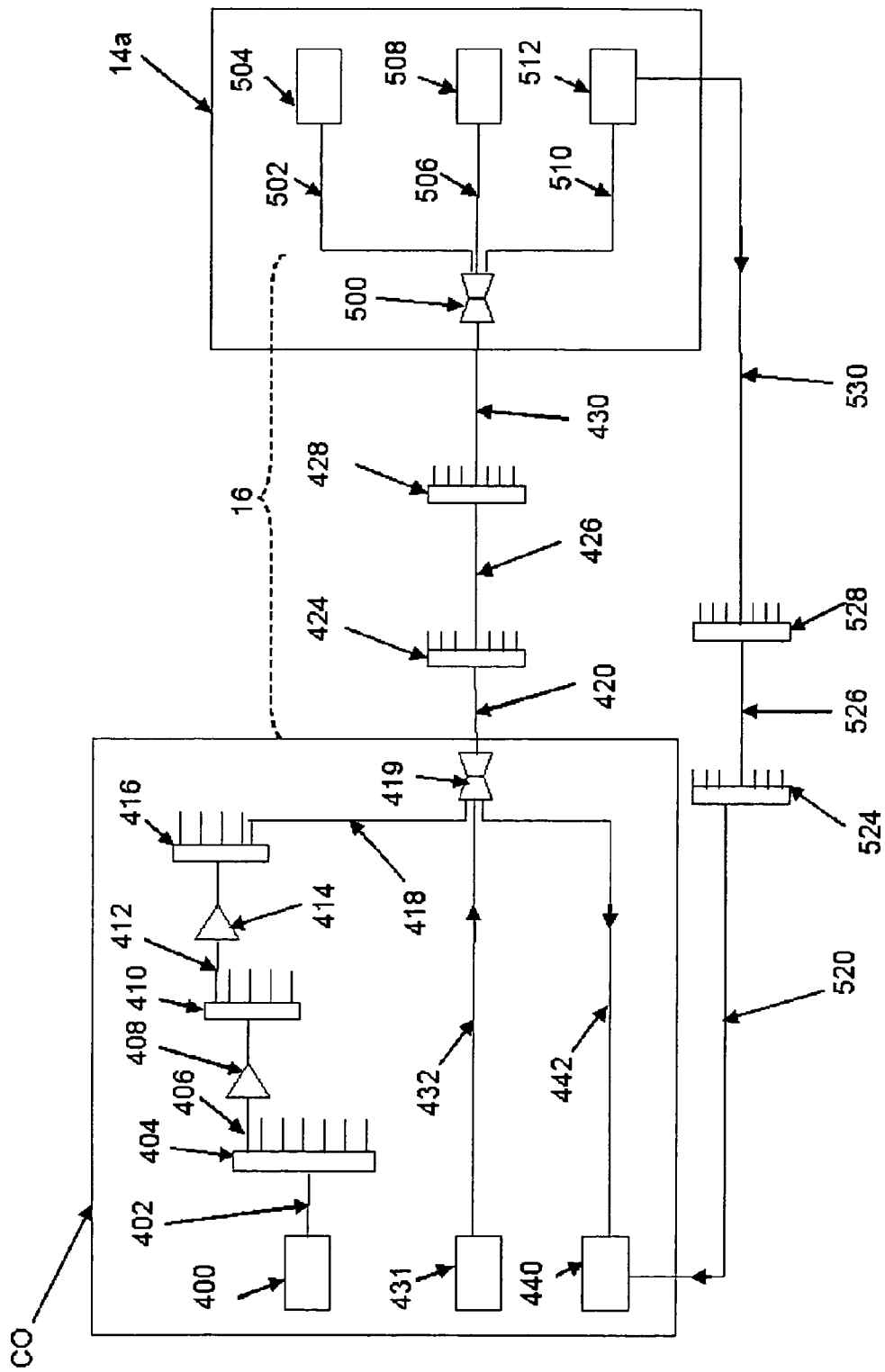
FIG. 8 illustrates another preferred embodiment of an optical communication system comprising a central office, at least one passive optical network, and at least one ONT.

FIG. 8 illustrates another preferred embodiment of an optical communication system comprising a central office CO, at least one passive optical network 16, and at least one ONT 14a. The CO comprises an analog transmitter 400 which preferably transmits one or more analog optical signals in an operating wavelength range around 1550 nm, for example between 1530 and 1565 nm. The signals are transported by optical fiber line 402 to splitter 404 which is capable of splitting the signals into multiple output paths including optical fiber line 406 which includes amplifier 408 that amplifies the signals before entering splitter 410. The signals are then split and are carried by optical fiber line 412, which includes amplifier 414, to splitter 416. The signal then travels via optical fiber line 418 to a wavelength division multiplexer (WDM MUX) 419. The CO also comprises a digital transmitter 431 which preferably transmits one or more digital signals in an operating wavelength range of around 1490 nm. The optical signals generated by transmitter 431 are carried by optical fiber line 432 to WDM MUX 419. The CO also comprises a digital receiver 440 which preferably receives optical signals in an operating wavelength range of around 1310 nm from the WDM MUX 419 via optical fiber line 442.

WDM MUX 419 is optically connected to splitter 424 via optical fiber line, or feeder line, 420. Splitter 424 is the first splitter outside the CO and is located remotely from the CO, preferably greater than 500 meters away. Splitter 424 is thus a "primary splitter", and preferably is a power splitter. Splitter 424 is optically connected to splitter 428 via optical fiber line, or distribution line, 426. Splitter 428 is preferably a power splitter. Splitter 428 is optically connected to the ONT 14a via optical fiber line, or drop line, 430.

WDM MUX 500 is located within ONT 14a and is optically connected to receiver 504 via optical path 502, and to receiver 508 via optical path 506, and to transmitter 512 via optical path 510. In preferred embodiments, WDM MUX 500 is a triplexer.

Receiver 504 receives the analog optical signals (in an operating wavelength range around 1550 nm) that are transmitted by transmitter 400. Receiver 508 receives the digital optical signals (in an operating wavelength range around 1490 nm) that are transmitted by transmitter 430. Transmitter 512 transmits one or more optical signals in an operating wavelength range around 1310 nm for reception at receiver 440. Lines 420, 426, and 430 are capable of simultaneously transporting optical signals at up to at least three wavelengths.

Preferably WDM MUX 419, lines 420, 426 and 430, splitters 424 and 428, and WDM MUX 500 form a passive optical network and employ no active components, and more preferably include no active components.

FIG. 8 illustrates an optional second fiber path for signals returning upstream from ONT 14a wherein transmitter 512 is optically connected to splitter 528 via optical fiber line 530. Splitter 528 is the first splitter outside the ONT that the return signals encounter. Splitter 524 is optically connected to splitter 528 via optical fiber line 526. Splitter 524 is optically connected to the receiver 440 via optical fiber line 520. Signals from transmitter 512 may be carried by line 510, line 530, or both.

In some embodiments, one or more output paths from splitter 424 are optically connected to one or more ONTs by respective optical fiber lines.

The system may comprise a plurality of PONs, which may be optically connected to respective output paths of splitter 416, and/or splitter 410, and/or splitter 404.

Optionally, an ONT may include a receiver 504 but omit receiver 508 and/or transmitter 512. If, for example, both receiver 508 and transmitter 512 are absent from a particular ONT, then WDM MUX 500 may also be omitted and line 490 could be directly connected to receiver 504.

Figure 9:
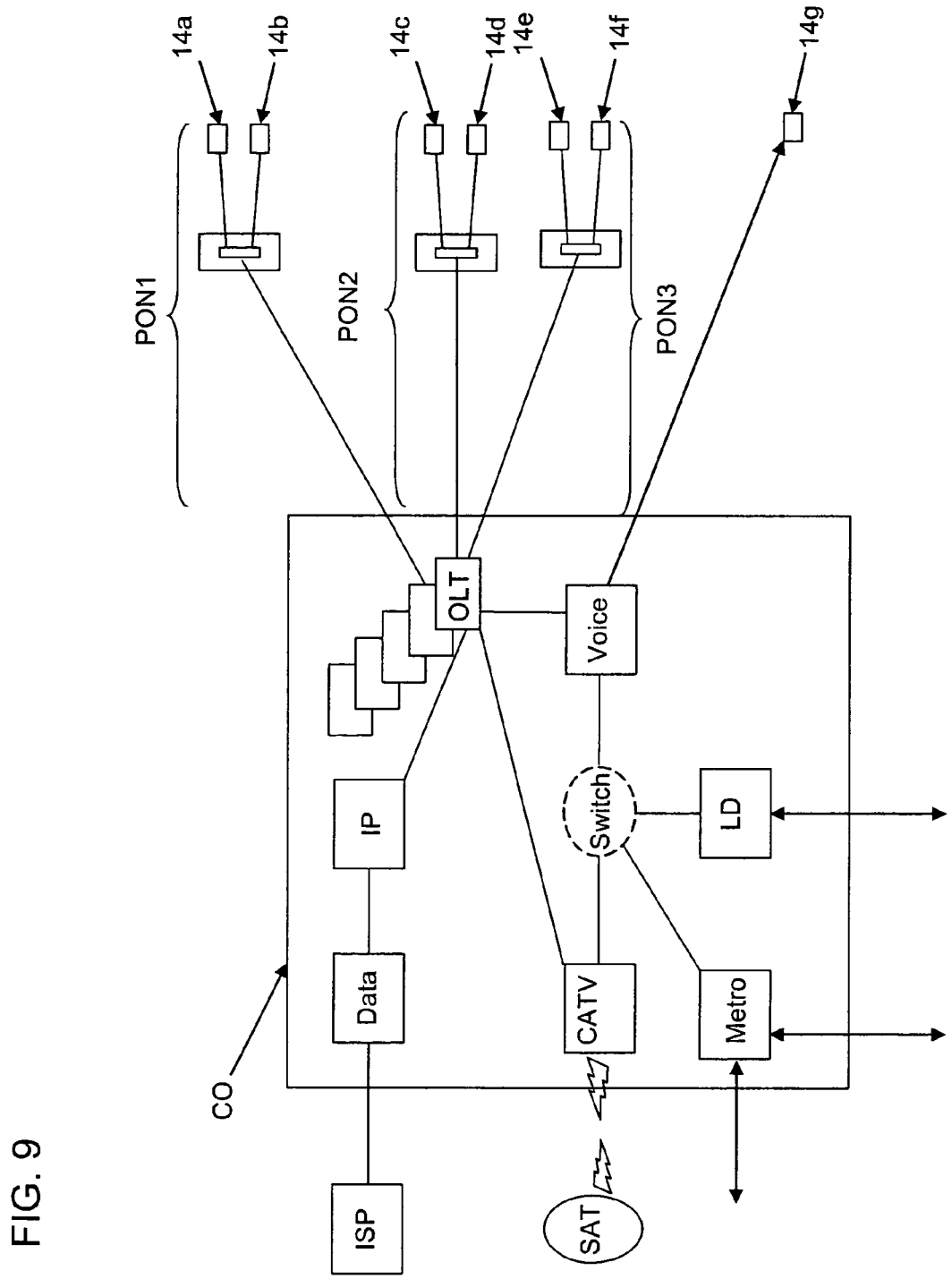
FIG. 9 illustrates another preferred embodiment of an optical communication system comprising a central office, at least one passive optical network, and at least one ONT.

A central office CO is a building or other structure or housing or enclosure that houses one or more signal sources, wherein at least one signal source is an optical signal source. For example, referring to FIG. 9, the central office may house central office equipment such as: internet protocol (IP) routers; a data center (Data); a voice terminal (Voice); long distance communication equipment (LD) that may send and/or receive long distance communication signals; metropolitan communication equipment (Metro) that may send and/or receive metro communication signals; a cable television (CATV) terminal which may receive signals from a head end, such that the CATV terminal may comprise satellite equipment for establishing a satellite link with a head end via a satellite (SAT). The central office advantageously comprises an electronic switch, or central office switch, or plurality of switches (represented generally as "Switch" in FIG. 9) which can connect one or more voice terminals to one or more pieces of central office equipment to allow one-way or two-way transmission of signals within the central office. Advantageously, one or more OLTs are connected to one or more PONs (PON1, PON2, PON3, etc.). OLTs are also connected to one or more of the voice terminal, the IP router and Internet center, and the CATV terminal (broadcast video). Central office equipment such as the metropolitan communication equipment or the long distance communication equipment preferably has the capability of receiving and sending signals to and from the central office without passing the signals through a PON, wherein the metro and long distance lines leading out of the CO preferably are optically connected to one or more other CO's. The data center (DATA) preferably communicates with an internet service provider (ISP) outside of the CO. The voice terminal in the central office may be connected to one or more subscribers without passing signals through a PON.

With regard to any of the above sets of preferred embodiments, additional preferred embodiments include, respectively, the primary splitter being capable of splitting the optical signal to at least 4, 16, 32, 64, or 128 downstream paths.

With regard to any of the above sets of preferred embodiments, additional preferred embodiments include: the primary splitter being capable of splitting the optical signal to at least 32 downstream paths and the trunk optical fiber link or feeder line having an optical fiber path length not less than 20 km; the primary splitter being capable of splitting the optical signal to at least 32 downstream paths and the trunk optical fiber link having an optical fiber path length not less than 25 km; and the primary splitter being capable of splitting the optical signal to at least 32 downstream paths and the trunk optical fiber link having an optical fiber path length not less than 30 km.

With regard to any of the above sets of preferred embodiments which do not explicitly recite one or more intermediate splitters, additional preferred embodiments include, respectively: the optical signal being split only once between the central office and the plurality of remote terminals; in addition, the primary splitter being capable of splitting the optical signal to at least 16 downstream paths; in addition; the trunk optical fiber link having an optical path length greater than 5 km.

With regard to any of the above sets of preferred embodiments, additional preferred embodiments include the primary splitter being capable of splitting the optical signal to at least 32 downstream paths. Additionally, in other respective preferred embodiments, the trunk optical fiber link or feeder line has an optical path length greater than 7 km, or 10 km, or 15 km.

With regard to any of the above sets of preferred embodiments, additional preferred embodiments include the primary splitter being capable of splitting the optical signal to at least 64 downstream paths. Additionally, in other respective preferred embodiments, the trunk optical fiber link or feeder line has an optical path length greater than 7 km, or 10 km, or 15 km.

With regard to any of the above sets of preferred embodiments, additional preferred embodiments include the optical network being a passive optical network.

With regard to any of the above sets of preferred embodiments, additional preferred embodiments include the central terminal or optical signal source comprising a transmitter and an amplifier for amplifying the optical signal generated by the transmitter.

With regard to any of the above sets of preferred embodiments, the output power of the optical signal leaving the optical signal service is greater than or equal to the launch power of that signal entering the feeder line.

With regard to any of the above sets of preferred embodiments, additional preferred embodiments include the optical signal source being capable of generating signals at a plurality of wavelengths in one or more operating wavelength ranges, the optical signal source comprising a plurality of transmitters, each transmitter being capable of generating optical signals at a respective wavelength. In one preferred embodiment, the plurality of wavelengths includes wavelengths between about 1460 nm to about 1625 nm. In another preferred embodiment, the optical signal source generates optical signals in a plurality of operating wavelength ranges. In another preferred embodiment, the optical signal source generates a first optical signal at a first wavelength in a first operating wavelength range and a second optical signal at a second wavelength in a second operating wavelength range; either the first wavelength or the second wavelength is between about 1300 nm to about 1320 nm, or either the first wavelength or the second wavelength is between about 1460 nm to about 1520 nm, or either the first wavelength or the second wavelength is between about 1530 nm to about 1570 nm. In one preferred embodiment, the transmitter comprises a Fabry-Perot laser. In another preferred embodiment, the transmitter comprises a VCSEL laser. In yet another preferred embodiment, the optical signal source or central terminal is capable of emitting one or more optical signals having a respective one or more wavelengths in one or more of the following operating wavelength ranges: 1260 to 1360 nm, 1360 to 1480 nm, 1480 to 1500 nm, 1539 to 1565 nm, and/or 1550 to 1560 nm. Operation in the 1360 to 1480 nm range can be enhanced by utilizing optical fiber having a low hydroxyl (H¯F) concentration (so-called low-water optical fiber).

In some preferred embodiments, the optical signal distribution network further comprises a plurality of intermediate splitters optically connected to the primary splitter by respective branch optical fiber links or distribution lines, wherein each intermediate splitter is capable of splitting the optical signal to at least 2 downstream paths. In other preferred embodiments, the intermediate splitter is capable of splitting the optical signal to at least 4 downstream paths. In still other preferred embodiments, the intermediate splitter is capable of splitting the optical signal to at least 8 downstream paths. In yet other preferred embodiments, the intermediate splitter is capable of splitting the optical signal to at least 16 downstream paths. In other preferred embodiments, the intermediate splitter is capable of splitting the optical signal to at least 32 downstream paths. In still other preferred embodiments, the intermediate splitter is capable of splitting the optical signal to at least 64 downstream paths. In other preferred embodiments, the intermediate splitter is capable of splitting the optical signal to at least 128 downstream paths.

Preferably, the aggregate split ratio between the central office (comprising a central terminal or optical signal source) and the plurality of remote terminals is at least 1:32. In a preferred embodiment, the aggregate split ratio between the central office and the plurality of remote user sites is at least 1:64.

Preferably, at least one optical signal is transmitted at a wavelength within a wavelength range between 1530 nm and 1565 nm. In a preferred embodiment, the optical signal is transmitted at a wavelength of about 1550 nm. In another preferred embodiment, at least one optical signal is transmitted at a wavelength within a wavelength range between 1460 nm and 1520 nm. In one preferred embodiment, the optical signal is transmitted at a wavelength of about 1490 nm.

Preferably, the optical signal source is capable of simultaneously delivering first and second optical signals.

Preferably, the central terminal (or optical signal source) further comprises an optical signal receiver capable of receiving a third optical signal transmitted upstream through the primary splitter. In a preferred embodiment, the first optical signal is transmitted at a wavelength within a wavelength range between 1530 nm and 1565 nm, and the second optical signal is transmitted at a wavelength within a wavelength range between 1460 nm and 1520 nm. In another preferred embodiment, the third optical signal is transmitted at a wavelength within a wavelength range between 1290 nm and 1320 nm.

In a preferred embodiment, the trunk optical fiber link or feeder line exhibits a maximum reflected power which is 20 dBm less than the output power at the wavelength and preferably 20 dBm less than the launch power into the feeder line. In another preferred embodiment, the trunk optical fiber link exhibits a maximum reflected power which is 25 dBm less than the output power at the wavelength and preferably 25 dBm less than the launch power into the feeder line. In still another preferred embodiment, the trunk optical fiber link exhibits a maximum reflected power which is 30 dBm less than the output power at the wavelength and preferably 30 dBm less than the launch power into the feeder line.

In one preferred embodiment, the system operates at less than or equal to about 500 Mbit/s. In another preferred embodiment, the system operates at less than or equal to about 650 Gbit/s. In yet another preferred embodiment, the system operates at less than or equal to about 1 Gbit/s. In still another preferred embodiment, the system operates at less than or equal to about 2 Gbit/s.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical communication system comprising:
   an optical signal source for providing optical signals at an output power;
   a plurality of remote terminals, wherein at least one of the remote terminals comprises a receiver; and
   an optical signal distribution network optically connecting the optical signal source to the receiver, the network comprising a feeder line having an optical fiber path length greater than 500 meters;
   wherein the optical signals are launched into the feeder line with a launch power and the system parameters are selected so that at the remote terminal comprising the receiver, in the operating wavelength range, CNR is greater than 43 dBc or CSO is less than −58 dBc or CTB is less than −58 dBc for substantially all channels with frequencies in the 45-560 MHz range when the launch power is greater than 20 dBm.

2. The optical communication system of claim 1 wherein the optical signal distribution network further comprises a primary splitter optically connected to the optical signal source by the feeder line, and wherein the primary splitter is capable of splitting the optical signal to at least 2 downstream paths.

3. The optical communication system of claim 1 wherein the optical signal distribution network further comprises a primary splitter optically connected to the optical signal source by the feeder line, and wherein the primary splitter is capable of splitting the optical signal to at least 2 downstream paths, and wherein the feeder line has an optical fiber path length greater than 500 meters.

4. The optical communication system of claim 3 wherein the primary splitter is disposed within a remote node.

5. The optical communication system of claim 3 wherein the feeder line has an optical fiber path length greater than 6 km.

6. The optical communication system of claim 3 wherein the launch power is greater than 21 dBm.

7. The optical communication system of claim 3 wherein the launch power is greater than 23 dBm.

8. The optical communication system of claim 3 wherein the feeder line has an optical fiber path length greater than 7 km.

9. The optical communication system of claim 3 wherein the feeder line has an optical fiber path length greater than 10 km.

10. The optical communication system of claim 3 wherein the feeder line has an optical fiber path length greater than 15 km.

11. The optical communication system of claim 3 wherein the launch power is greater than 21 dBm and the primary splitter is capable of splitting the optical signal to at least 4 downstream paths.

12. The optical communication system of claim 3 wherein the optical signal distribution network further comprises at least one intermediate splitter optically connected to the primary splitter by respective distribution lines.

13. The optical communication system of claim 3 wherein the primary splitter is capable of splitting the optical signal to at least 4 downstream paths and wherein the optical signal distribution network further comprises at least one intermediate splitter optically connected to the primary splitter by respective distribution lines, wherein the at least one intermediate splitter is capable of splitting the optical signal into at least 2 downstream paths.

14. The optical communication system of claim 3 wherein the primary splitter is capable of splitting the optical signal to at least 4 downstream paths, and the optical signal is split only once between the optical signal source and the plurality of remote terminals.

15. The optical communication system of claim 3 wherein the primary splitter is capable of splitting the optical signal to at least 32 downstream paths.

16. The optical communication system of claim 3 wherein the primary splitter is capable of splitting the optical signal to at least 4 downstream paths, the optical signal is split only once between the optical signal source and the plurality of remote terminals, and wherein the system parameters are selected so that, in the operating wavelength range, CNR is greater than 43 dBc and CSO is less than −58 dBc and CTB is less than −58 dBc for substantially all channels with frequencies in the 45-560 MHz range when the launch power is greater than 20 dBm.

17. The optical communication system of claim 3 wherein the feeder line has an optical fiber path length greater than 20 km, the primary splitter is capable of splitting the optical signal to at least 32 downstream paths, and the optical signal is split only once between the optical signal source and the plurality of remote terminals.

18. The optical communication system of claim 3 wherein the system parameters are selected so that, in the operating wavelength range, CNR is greater than 43 dBc and CSO is less than −58 dBc and CTB is less than −58 dBc for substantially all channels with frequencies in the 45-560 MHz range when the launch power is greater than 20 dBm.

19. A communications network comprising:
a central office comprising a central terminal comprising a transmitter for generating an optical signal at a wavelength within an operating wavelength range, wherein the optical signal leaves the central terminal with an output power;
a plurality of remote terminals, wherein at least one of the remote terminals comprises a receiver for receiving the optical signal; and
an optical network optically connecting the central terminal to the plurality of remote terminals, the optical network comprising a remote node and a plurality of optical fiber lines including a feeder line connecting the central office to the remote node, wherein the remote node comprises a primary splitter, and wherein the feeder line optically connects the central terminal to the primary splitter, wherein remote node is located remotely from the central office by a distance of greater than 5 km and the feeder line has an optical fiber length greater than 5 km, wherein the primary splitter is capable of splitting the optical signal into at least 2 downstream paths, wherein the receiver is optically connected to at least one of the at least 2 downstream paths, and wherein the optical signal having a launch power is launched into the feeder optical fiber link;
wherein the communications network parameters are selected to provide a CNR greater than 50 dBc in the operating wavelength range for substantially all channels with frequencies in the 45-560 MHz range when the launch power is greater than or equal to 23 dBm.

20. A communications network comprising:
a central office comprising a central terminal for outputting an optical signal with an output power at a wavelength within an operating wavelength range;
a plurality of remote terminals, wherein at least one of the remote terminals comprises a receiver for receiving the optical signal; and
an optical network optically connecting the central terminal to the plurality of remote terminals, the optical network comprising a primary splitter at a remote node and a plurality of optical fiber lines including a feeder line connecting the central office to the remote node, wherein the feeder line optically connects the central terminal to the primary splitter, wherein the primary splitter is located remotely from the central office by a distance of greater than 10 km and the feeder line has an optical fiber length greater than 10 km, wherein the primary splitter is capable of splitting the optical signal into at least 2 downstream paths, wherein the receiver is optically connected to at least one of the at least 2 downstream paths, and wherein the optical signal having a launch power is launched into the feeder line;
wherein the communications network parameters are selected to provide a CNR greater than 50 dBc in the operating wavelength range for substantially all channels with frequencies in the 45-560 MHz range when the launch power is greater than or equal to 19 dBm.

21. The communications network of claim 20 wherein the central terminal comprises a transmitter for generating the optical signal.

22. The communications network of claim 20 wherein the feeder line has an optical fiber path length greater than 15 km.

23. A method of transmitting optical signals, the method comprising:
optically connecting an optical signal source to a plurality of remote terminals via a passive optical network, the passive optical network comprising a feeder line having an optical fiber path length greater than 500 meters; and
generating optical signals with the optical signal source and launching the optical signals into the feeder line at a launch power of at least 20 dBm at a wavelength in an operating wavelength range;
wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than 20 dBm.

24. The method of claim 23 wherein the passive optical network further comprises a primary splitter, wherein the feeder line provides at least part of the optical path between the optical signal source and the primary splitter.

25. The method of claim 23 wherein at least one of the remote terminals comprises a receiver.

26. The method of claim 23 wherein the feeder line has an optical fiber path length greater than 1 km.

27. The method of claim 23 wherein the feeder line has an optical fiber path length greater than 5 km.

28. A method of transmitting optical signals, the method comprising:
connecting a central office to a plurality of remote terminals via a passive optical network, the passive optical network comprising a primary splitter and a plurality of optical fiber lines including a feeder line connecting the central office and the primary splitter, wherein at least one of the remote terminals comprises a receiver;
optically connecting the primary splitter to the receiver; and
generating the optical signals at the central office and launching the optical signals into the feeder line at a launch power of at least 20 dBm at a wavelength in an operating wavelength range;
wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than 20 dBm.

29. The method of claim 28 wherein the feeder line has an optical fiber path length greater than 500 m.

30. The method of claim 28 wherein the feeder line has an optical fiber path length greater than 1 km.

31. The method of claim 28 wherein the feeder line has an optical fiber path length greater than 5 km.

32. The method of claim 28 wherein the feeder line comprises an optical fiber selected to exhibit a maximum reflected power which is at least 30 dBm less than the launch power at the wavelength when the launch power is at least 20 dBm.

33. The method of claim 28 wherein the system parameters are selected so that, in the operating wavelength range, CNR is greater than 43 dBc and CSO is less than −58 dBc and CTB is less than −58 dBc, for substantially all channels with frequencies in the 45-560 MHz range when the launch power is greater than 20 dBm.

34. An optical communication system comprising:
a central office comprising an optical signal source for providing an optical signal at an output power;
a plurality of remote terminals, wherein at least one of the remote terminals comprises a receiver; and
an optical signal distribution network connecting the central office to the receiver, the optical signal distribution network comprising a primary splitter located remotely from the central office and optically connected to the optical signal source by a feeder line, wherein the optical signal is launched into the feeder line at a launch power, and wherein the primary splitter is capable of splitting the optical signal to at least 2 downstream paths;

wherein the feeder line comprises an optical fiber having an optical fiber path length greater than 5 km and a zero-dispersion wavelength less than 1400 nm, and the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than 18 dBm.

35. The optical communication system of claim 34 wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than 19 dBm.

36. The optical communication system of claim 34 wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than 20 dBm.

37. The optical communication system of claim 34 wherein the system parameters are selected so that, in the operating wavelength range, CNR is greater than 43 dBc and CSO is less than −58 dBc for substantially all channels with frequencies in the 45-560 MHz range when the launch power is greater than 20 dBm.

38. The optical communication system of claim 34 wherein the system parameters are selected so that, in the operating wavelength range, CNR is greater than 43 dBc and CTB is less than −58 dBc for substantially all channels with frequencies in the 45-560 MHz range when the launch power is greater than 20 dBm.

39. The optical communication system of claim 34 wherein the system parameters are selected so that, in the operating wavelength range, CSO is less than −58 dBc and CTB is less than −58 dBc for substantially all channels with frequencies in the 45-560 MHz range when the launch power is greater than 20 dBm.

40. The optical communication system of claim 34 wherein the system parameters are selected so that, in the operating wavelength range, CNR is greater than 43 dBc and CSO is less than −58 dBc and CTB is less than −58 dBc for substantially all channels with frequencies in the 45-560 MHz range when the launch power is greater than 20 dBm.

41. The optical communication system of claim 34 wherein the feeder line has an optical fiber path length greater than 10 km.

42. The optical communication system of claim 34 wherein the feeder line has an optical fiber path length greater than 12 km.

43. The optical communication system of claim 34 wherein the feeder line has an optical fiber path length greater than 13 km.

44. The optical communication system of claim 34 wherein the primary splitter is located remotely from the central office by a distance of greater than 10 km, wherein the feeder line has an optical fiber path length greater than 10 km, and wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than or equal to 19 dBm.

45. The optical communication system of claim 34 wherein the primary splitter is located remotely from the central office by a distance of greater than 8 km, wherein the feeder line has an optical fiber path length greater than 8 km, and wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than or equal to 20 dBm.

46. The optical communication system of claim 34 wherein the primary splitter is located remotely from the central office by a distance of greater than 6 km, wherein the feeder line has an optical fiber path length greater than 6 km, and wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than or equal to 21 dBm.

47. The optical communication system of claim 34 wherein the system parameters are selected so that, in the operating wavelength range, CNR is greater than 43 dBc or CSO is less than −58 dBc or CTB is less than −58 dBc for substantially all channels with frequencies in the 45-560 MHz range when the launch power is greater than or equal to 23 dBm.

48. The optical communication system of claim 34 wherein the system parameters are selected so that, in the operating wavelength range, CNR is greater than 43 dBc and CSO is less than −58 dBc and CTB is less than −58 dBc for substantially all channels with frequencies in the 45-560 MHz range when the launch power is greater than 18 dBm.

* * * * *